(12) United States Patent
Ootomo et al.

(10) Patent No.: US 7,604,021 B2
(45) Date of Patent: Oct. 20, 2009

(54) STEAM VALVE

(75) Inventors: Fumio Ootomo, Zama (JP); Tsutomu Ooishi, Yokohama (JP); Yoshiki Niizeki, Tokyo (JP); Yoshitaka Fukuyama, Yokohama (JP); Hisashi Matsuda, Tokyo (JP); Osamu Shindo, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 469 days.

(21) Appl. No.: 10/533,396

(22) PCT Filed: Oct. 29, 2003

(86) PCT No.: PCT/JP03/13824

§ 371 (c)(1),
(2), (4) Date: Jun. 29, 2005

(87) PCT Pub. No.: WO2004/040099

PCT Pub. Date: May 13, 2004

(65) Prior Publication Data

US 2005/0268973 A1    Dec. 8, 2005

(30) Foreign Application Priority Data

Oct. 29, 2002 (JP) ............................ 2002-314815
Mar. 31, 2003 (JP) .............................. 2003-96780

(51) Int. Cl.
*F01D 17/10* (2006.01)
*F16K 31/06* (2006.01)

(52) U.S. Cl. .................. 137/545; 137/613; 137/549; 137/625.3

(58) Field of Classification Search ................. 137/613, 137/545, 549, 625.3
See application file for complete search history.

(56) References Cited

U.S. PATENT DOCUMENTS

| 4,121,617 | A | 10/1978 | Masek et al. |
| 4,481,775 | A | 11/1984 | Beveridge |
| 5,870,896 | A | 2/1999 | Clark et al. |
| 6,305,398 | B1 | 10/2001 | Logar et al. |
| 7,284,569 | B2 * | 10/2007 | Takemaru .................. 137/545 |
| 2005/0063818 | A1 | 3/2005 | Suter |

FOREIGN PATENT DOCUMENTS

| JP | 57-167960 | 4/1954 |
| JP | 56-171605 | 5/1955 |
| JP | 50-13702 A | 2/1975 |

(Continued)

*Primary Examiner*—Kevin L Lee
(74) *Attorney, Agent, or Firm*—Foley & Lardner LLP

(57) ABSTRACT

A steam valve in accordance with the present invention is the steam valve that houses a first valve device 21 composed of a valve seat, a valve body, a valve rod, and a driving device, and a second valve device 22 composed of the valve seat, the valve body, the valve rod, and the driving device, combined with each other in the valve casing 23, and a closing portion 41 to block a part of a main steam flow flowing from outside to inside of a strainer is formed in the strainer 27 that is housed in the valve casing 23 and that surrounds the valve body 29 of the first valve device. According to the above described configuration, the steam valve that is aimed to further decrease a pressure loss can be provided by effectively controlling the steam flow in the strainer housed in the valve casing.

33 Claims, 19 Drawing Sheets

FOREIGN PATENT DOCUMENTS

| | | |
|---|---|---|
| JP | 54-145071 A | 11/1979 |
| JP | 55-148906 A | 11/1980 |
| JP | 56-32011 A | 4/1981 |
| JP | 56-124606 A | 9/1981 |
| JP | 57-152405 | 9/1982 |
| JP | 58-63303 | 4/1983 |
| JP | 58-98404 | 7/1983 |
| JP | 58-122304 A | 7/1983 |
| JP | 58-137670 A | 8/1983 |
| JP | 60-17222 | 2/1985 |
| JP | 61-48904 | 4/1986 |
| JP | 61-092371 A | 5/1986 |
| JP | 2002-97903 A | 4/2002 |
| WO | WO 03/093653 A1 | 11/2003 |

\* cited by examiner

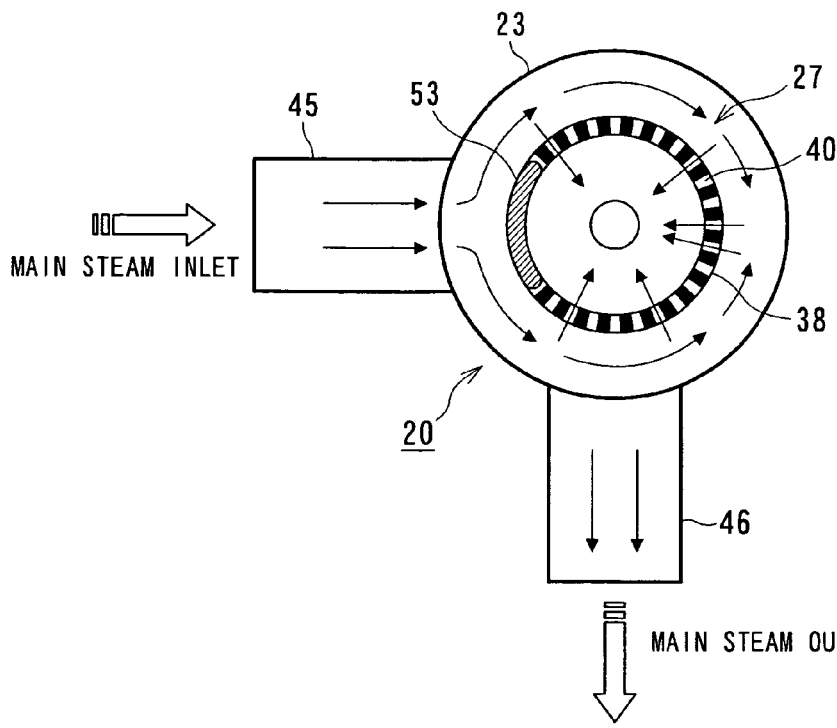
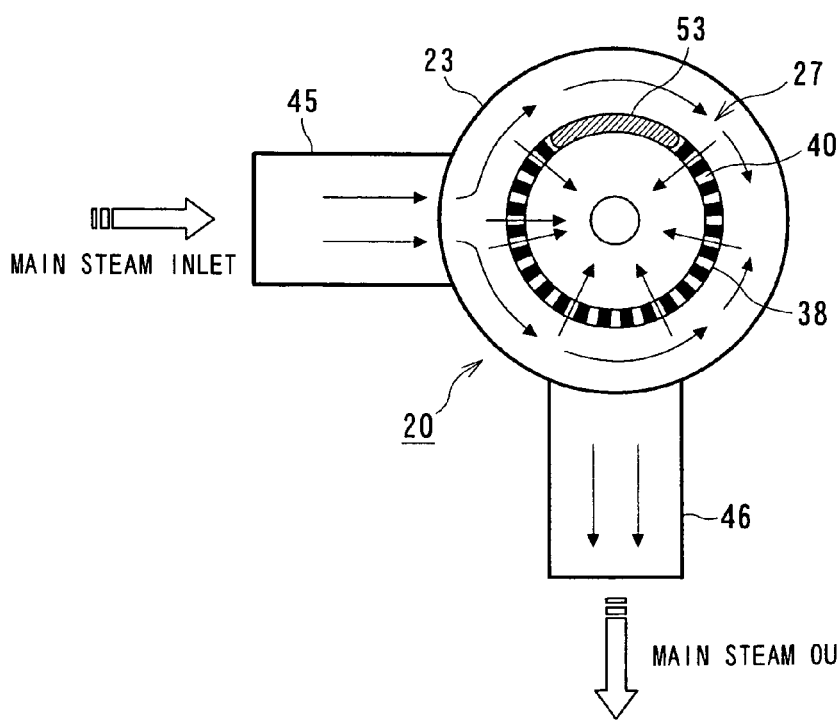

though a plurality of tiny
STEAM VALVE

TECHNICAL FIELD

The present invention relates to a steam valve applied to a steam turbine plant, and more particularly, relates to an improvement in a steam valve in which a main steam shut-off valve and a steam control valve (steam flow regulation valve) are combined.

BACKGROUND ART

In general, there are many steam turbine plants having so-called three-casing axial-flow type structures in which a high pressure steam turbine, an intermediate pressure steam turbine, and a low pressure steam turbine are directly connected to a shaft of a turbine rotor so that a power generator generates as much load (output) as possible.

The steam turbine plant having the three-casing axial-flow type structure is configured to house a plurality of turbine stages, in which a turbine nozzle and a turbine blade are combined in a turbine casing of each of the high pressure steam turbine, the intermediate pressure steam turbine, and the low pressure steam turbine, along an axial direction of the turbine rotor. Further, the steam turbine plant performs expansion work at the turbine stage of the high pressure steam turbine with steam that is supplied from a boiler, and after the steam completes the expansion work, the steam is again heated by a reheater of the boiler. Then, the reheated steam is supplied to the low pressure turbine via the intermediate pressure turbine, and the steam drives the power generator by performing the expansion work at the turbine stage of each of the steam turbines. Thereafter, the steam is condensed into water by a condenser after completing the expansion work, and the condensed water is recycled by a supply water heater to serve as supply water. Consequently, the supply water is again fed back to the boiler.

In addition, the steam turbine plant is provided with a numbers of valve devices having different diameters in accordance with their function and use.

In these valve devices, in particular, both of a main steam shut-off valve and a steam control valve (steam flow regulation valve) disposed between the boiler and the high pressure steam turbine are configured to be super-sized valve devices having a pressure-proof structure, because steam at very high pressures from 16.6 MPa to 24.1 MPa, and at very high temperatures from 538° C. to 566° C. is applied thereto.

At this moment, for example, the main steam shut-off valve is a valve of an ON-OFF type that immediately supplies the steam toward the high pressure steam turbine when commencing operation, and that immediately shuts off when the load is shut off. In addition, for example, the steam control valve (steam flow regulation valve) is a valve of control valve type that controls the flow rate by opening a valve body at an arbitrary valve-opening amount in response to a demand of the load and that immediately shuts off the valve body when the load is shut off.

Heretofore, the above-described main steam shut-off valve and the steam control valve (steam flow regulation valve) are disposed at separate positions before-an inlet of the high pressure steam turbine. However, because both the size of the main steam shut-off valve and the size of the steam control valve (steam flow regulation valve) are extremely large, a large space for installing the main steam shut-off valve and the steam control valve (steam flow regulation valve) has been required.

However, recently, a so-called steam valve of combined type has been realized. That is, a reduced-size steam valve, requiring a small installation space by combining the main steam shut-off valve and the steam control valve (steam flow regulation valve) and housing the main steam shut-off valve and the steam control valve (steam flow regulation valve) in one valve casing, has been realized. An example of the configuration of the combined type steam valve is shown in FIGS. 30 through 32.

FIG. 30 is a conceptual diagram showing a known steam valve in which the main steam shut-off valve and the steam control valve (steam flow regulation valve) are housed in the valve casing, FIG. 31 is a diagram showing a main steam flow in a known steam valve in which the main steam shut-off valve and the steam control valve (steam flow regulation valve) are housed in the valve casing, and FIG. 32 is a cross-sectional view of FIG. 30 looking from arrows XXXII-XXXII.

For example, in a steam valve 1 composed of the main steam shut-off valve and the steam control valve (steam flow regulation valve) combined with each other, a first valve device 2 that corresponds to the main steam shut-off valve is disposed at an upstream side of the main steam flow, and a second valve device 3 that corresponds to the steam control valve (steam flow regulation valve) is disposed at a downstream side of the main steam flow, and in addition, the first valve device 2 and the second valve device 3 are housed in a valve casing 4.

The first valve device 2 is provided with a first main steam inlet 5 and a first main steam outlet 6 in the valve casing 4, which is connected to a second main steam inlet 7 of the second valve device 3, and the first valve device 2 houses a strainer 8 that removes impurities such as oxidized scale and the like.

Further, the first valve device 2 is provided with a first valve body 10 that detachably contacts a first valve seat 9 provided at a side of the first main steam outlet 6, and a first driving device 12 that drives the first valve body 10 to freely travel forward and backward via a first valve rod 11.

On the other hand, the second valve device 3 is provided with a second valve body 16 that detachably contacts a second valve seat 14 provided at a side of the second main steam outlet 13 and slides in a sleeve 15, and a second driving device 17 that drives the second valve body 16 to travel forward and backward via a second valve rod 17.

At the steam valve 1 having such a configuration as mentioned above, when the main steam supplied from the first main steam inlet 5 to the valve casing 4 passes, from outside to inside, through the strainer 8, which has a plurality of tiny holes, as shown in FIGS. 30 and 32, the impurities such as oxidized scale and the like are removed, and thereafter, the main steam flows along the first valve rod 11 and is further supplied to the high pressure steam turbine via the second main steam outlet 13 of the second valve device 3.

The steam valve 1 having such a configuration can be of course reduced in size because the first valve device 2 and the second valve device 3 are housed in one valve casing 4. In addition, the first valve device 2 of the steam valve 1 has a function to instantaneously shut off the main steam in an emergency and the second valve device 3 has a function to control the flow rate. As a result, the steam valve 1 is able to immediately respond to any one of starting operation, rated load operation, partly rated load operation, and emergency shutting-off operation of the steam turbine plant.

Further, the steam valve in which the steam shut-off valve and the steam control valve (steam flow regulation valve) are housed in one valve casing while being combined with each other is disclosed in, for example, Japanese Patent Laid-open (KOKAI) Publication No. 2002-97903.

The steam valve 1 that is configured to have, for example, the steam shut-off valve and, for example, the steam control valve (steam flow regulation valve) combined with each other has plenty of advantages, as described above. On the other hand, the steam valve 1 provides a number of problems, and one of the problems is a reduction of a pressure loss.

In the known steam valve 1, shown in FIGS. 30 through 32, a secondary flow occurs due to a drift, and other main steam flows into an area of the secondary flow where deficiency of flowing speed exists. Then, a swirling flow occurs when flowing out from the second valve device 3. This is because the steam valve 1 has a main steam path of the first valve device 2, the main steam path of the second valve device 3, and more than one acute-angle bend. Thus, the pressure loss has been further increased due to the swirling flow.

The pressure loss based on the swirling flow has also been confirmed according to experimented data, such as a fluid analysis values, tests, and the like.

Further, it is found that, in this kind of steam valve of the combined type, the main steam supplied from the first main steam inlet 5 is separated into two flows at an inlet side of the strainer 8, and passes around a surface thereof. Then, two steam jets join together at an outlet side of the strainer 8 and collide with each other, resulting in the occurrence of a large mixing loss.

Furthermore, it is also found that because the main steam passing through the strainer 8 passes through multiple holes formed in the strainer 8 in order of precedence, a component of the speed in an axial direction in an internal space thereof is induced and thereby, the strong secondary flow occurs.

Thus, with the known steam valve of the combined type, it is difficult to suppress the pressure loss caused by factors such as the secondary flow, the mixing loss, or the like.

In general, it is said that when the pressure loss of the steam valve is decreased by 1%, a heat rate of the steam turbine plant improves equal to or more than 0.1% (Literature: Turbomachinery Vol. 30 No. 7), and in light of an improvement of heat efficiency of the plant, a pressure loss reduction in the steam valve has become an important matter that cannot be disregarded.

The present invention is made in light of the above described background art, and an object of the present invention is to provide a steam valve in which a further reduction of pressure loss is realized by effectively controlling the main steam flow at the strainer housed in the valve casing.

DISCLOSURE OF THE INVENTION

The present invention provides a steam valve to achieve the above-described object, comprising:

a valve casing including a main steam inlet portion and a main steam outlet portion;

a first valve device disposed at the main steam inlet portion side in the valve casing including a valve seat, a valve body, a valve rod and a driving device;

a second valve device disposed at the main steam outlet portion side in the valve casing including a valve seat, a valve body, a valve rod and a driving device;

a strainer housed in the valve casing for surrounding the valve body of the first valve device; and a closing portion provided in the strainer for blocking a part of the main steam flow flowing from outside to inside.

The closing portion provided in the strainer may be disposed at a position opposite to a side of the main steam outlet.

The closing portion may be an interruption plate, and the interruption plate may be disposed at the position opposite to the side of the main steam outlet and outside the strainer.

The closing portion is the interruption plate, and the interruption plate may be disposed at the position opposite to the side of the main steam outlet and inside the strainer.

Further, the present invention provides a steam valve comprising:

a valve casing including a main steam inlet portion and a main steam outlet portion;

a first valve device disposed at the main steam inlet portion side in the valve casing including a valve seat, a valve body, a valve rod and a driving device;

a second valve device disposed at the main steam outlet portion side in the valve casing including a valve seat, a valve body, a valve rod and a driving device;

a strainer housed in the valve casing for surrounding the valve body of the first valve device; and a guide plate provided on the strainer for creating a main steam peel-off area of a main steam flow flowing from outside to inside of the strainer for surrounding the first valve device.

The guide plate may be provided at the position opposite to the side of the main steam outlet and outside the strainer.

Furthermore, the present invention provides a steam valve comprising:

a valve casing including a main steam inlet portion and a main steam outlet portion;

a first valve device disposed at the main steam inlet portion side in the valve casing including a valve seat, a valve body, a valve rod and a driving device;

a second valve device disposed at the main steam outlet portion side in the valve casing including a valve seat, a valve body, a valve rod and a driving device;

strainer housed in the valve casing for surrounding the valve body of the first valve device; and a closing plate rotatably provided in the strainer.

The rotatably provided closing plate may be disposed at a position facing the main steam inlet in an unsteady operation, and the rotatably provided closing plate may be disposed at the position opposite to the side of the main steam outlet.

Still furthermore, the present invention provides a steam valve comprising:

a valve casing including a main steam inlet portion and a main steam outlet portion;

a first valve device disposed at the main steam inlet portion side in the valve casing including a valve seat, a valve body, a valve rod and a driving device; and a second valve device disposed at the main steam outlet portion side in the valve casing including a valve seat, a valve body, a valve rod and a driving device, in which the first valve device is formed into a vertical structure, while the second valve device is formed into a lateral structure and disposed upstream side from the first valve device.

Still furthermore, the present invention provides a steam valve comprising:

a valve casing including a main steam inlet at one side and a main steam outlet disposed at another side in an opposite direction and in parallel with the main steam inlet;

a strainer provided in the valve casing; and a closing portion provided in the strainer at a position in a direction crossing an axial line of each of the main steam inlet and the main steam outlet.

The closing portion may be an interruption plate, and the interruption plate may be disposed outside the strainer.

Still furthermore, the present invention provides a steam valve comprising:

a valve casing including a main steam inlet at one side and a main steam outlet disposed at another side in an opposite direction and in parallel with the main steam inlet;

a strainer provided in the valve casing;

a rotatably sliding rotating interruption plate surrounding the strainer; and a driving device for driving the rotating interruption plate.

The rotating interruption plate may be provided with an adjusting stopper for adjusting a rotational transfer region.

The rotating interruption plate may be provided with a fitting piece for adjusting a rotational transfer region.

Still furthermore, the present invention provides a steam valve comprising:

a valve casing including a main steam inlet disposed at one side and a main steam outlet disposed at another side in an opposite direction and in parallel with the main steam inlet;

a strainer provided in the valve casing;

an interruption plate for surrounding the strainer; and an insertion and pull-out path formed on a valve lid of the valve casing, for freely inserting and pulling-out the interruption plate.

The interruption plate may be provided with an adjusting stopper for adjusting the rotational transfer region.

The interruption plate may be provided with a fitting piece for adjusting the rotational transfer region.

Still furthermore, the present invention provides a steam valve comprising:

a valve casing including a main steam inlet disposed at one side and a main steam outlet disposed at another side in an opposite direction and in parallel with the main steam inlet;

a strainer provided in the valve casing; and an interruption plate provided inside the strainer.

The interruption portion may be a projection piece disposed upstream side from a valve seat of the valve casing.

The interruption portion may be a projection piece disposed downstream side from a valve seat of the valve casing.

Still furthermore, the present invention provides a steam valve comprising:

a valve casing including a main steam inlet portion and a main steam outlet portion;

a first valve device disposed at the main steam inlet portion side in the valve casing including a valve seat, a valve body, a valve rod and a driving device;

a second valve device disposed at the main steam outlet portion side in the valve casing including a valve seat, a valve body, a valve rod and a driving device;

a strainer housed in the valve casing for surrounding the valve body of the first valve device;

a closing portion provided in the strainer for blocking a part of a main steam flow flowing from outside to in side; and a bulkhead provided between the strainer and the valve casing to prevent a collision of the two main steam flows having been separated by and flowing around from the closing portion.

The closing portion provided in the strainer may be disposed at a position facing the main steam inlet.

The bulkhead may be disposed at the position opposite to the side of the closing portion.

Still furthermore, the present invention provides a steam valve comprising:

a valve casing including a main steam inlet portion and a main steam outlet portion;

a first valve device disposed at the main steam inlet portion side in the valve casing including a valve seat, a valve body, a valve rod and a driving device;

a second valve device disposed at the main steam outlet portion side in the valve casing including a valve seat, a valve body, a valve rod and a driving device;

a strainer housed in the valve casing for surrounding the valve body of the first valve device;

an interruption plate provided in the strainer for blocking a part of a main steam flow flowing from outside to in side; and a bulkhead provided between the strainer and the valve casing to prevent a collision of the two main steam flows having been separated by and flowing around from the closing portion.

The interruption plate may be disposed at a position outside the strainer and facing the main steam inlet.

The interruption plate may be disposed at a position inside the strainer and facing the main steam inlet.

Still furthermore, the present invention provides a steam valve comprising:

a valve casing including a main steam inlet portion and a main steam outlet portion;

a first valve device disposed at the main steam inlet portion side in the valve casing including a valve seat, a valve body, a valve rod and a driving device;

a second valve device disposed at the main steam outlet portion side in the valve casing including a valve seat, a valve body, a valve rod and a driving device;

a strainer housed in the valve casing for surrounding the valve body of the first valve device;

a closing portion provided in the strainer for blocking a part of a main steam flow flowing from outside to inside;

a bulkhead provided between the strainer and the valve casing to prevent a collision of the two main steam flows having been separated by and flowing around from the closing portion; and a pressure-recovering chamber formed into a shape broadened toward the end, provided in the valve casing and disposed downstream from the strainer provided with the closing portion.

Still furthermore, the present invention provides a steam valve comprising:

a valve casing including a main steam inlet at one side and a main steam outlet disposed at another side in an opposite direction and in parallel with the main steam inlet;

a strainer provided in the valve casing;

a closing portion for blocking a part of a main steam flow flowing from outside to inside; and a bulkhead provided between the strainer and the valve casing to prevent a collision of the two main steam flows having been separated by and flowing around from the closing portion.

Still furthermore, the present invention provides a steam valve comprising:

a valve casing including a main steam inlet at one side and a main steam outlet disposed at another side in an opposite direction and in parallel with the main steam inlet;

a strainer provided in the valve casing;

a guide plate provided at a side facing the main steam inlet of the strainer;

a closing portion for blocking a part of the main steam flow flowing from outside the guide plate to inside; and a bulkhead provided between the strainer and the valve casing disposed at a position facing the position opposite to the side of the guide plate.

The guide plate may be formed into a wing-shape.

Still furthermore, the present invention provides a steam valve comprising:

a valve casing including a main steam inlet portion and a main steam outlet portion;

a first valve device disposed at the main steam inlet portion side in the valve casing including a valve seat, a valve body, a valve rod and a driving device;

a second valve device disposed at the main steam outlet portion side in the valve casing including a valve seat, a valve body, a valve rod and a driving device;

a strainer housed in the valve casing for surrounding the valve body of the first valve device;

a closing portion provided in the strainer for blocking a part or a main steam flow flowing from outside to inside;

a bulkhead provided between the strainer and the valve casing to prevent a collision of the two main steam flows having been separated by and flowing around from the closing portion; and a rack-like flow path formed between the valve casing and the strainer along a shaft length direction of the valve rod of the first valve device at a distance.

The rack-like flow path may be partitioned with a flow path partitioning plate, which is disposed around an entire outside circumference of the strainer.

The flow path partitioning plate may be disposed around an entire circumference of the strainer.

The flow path partitioning plate may be disposed around a predetermined part of the entire circumference of the strainer.

According to the steam valve of the present invention provided with the above-described structures and characteristics, a device for blocking a part of the main steam flow is included in the strainer where the main steam flows from outside of the strainer to inside thereof, and the device for blocking the part of the main steam flow is disposed at an appropriate position in the strainer. Accordingly, the other main steam is prevented from flowing into the area where the deficiency of the speed of secondary flow based on the drift of the main steam that flows from outside of the strainer to inside thereof exists, and the pressure loss due to the swirling flow of the main steam can be further decreased.

BRIEF DESCRIPTION OF THE DRAWINGS

FIG. 9 is a conceptual diagram showing a steam valve according to a seventh embodiment of the present invention, in which FIG. 9A is a conceptual plan view showing a steam valve when a closing plate mounted on a strainer is moved to a position facing a main steam inlet in a steady operation, and FIG. 9B is a conceptual plan view showing the steam valve when the closing plate mounted on the strainer is moved to a position opposite to the side of the main steam outlet in an unsteady operation.

BEST MODE FOR EMBODYING THE INVENTION

Figure 1:
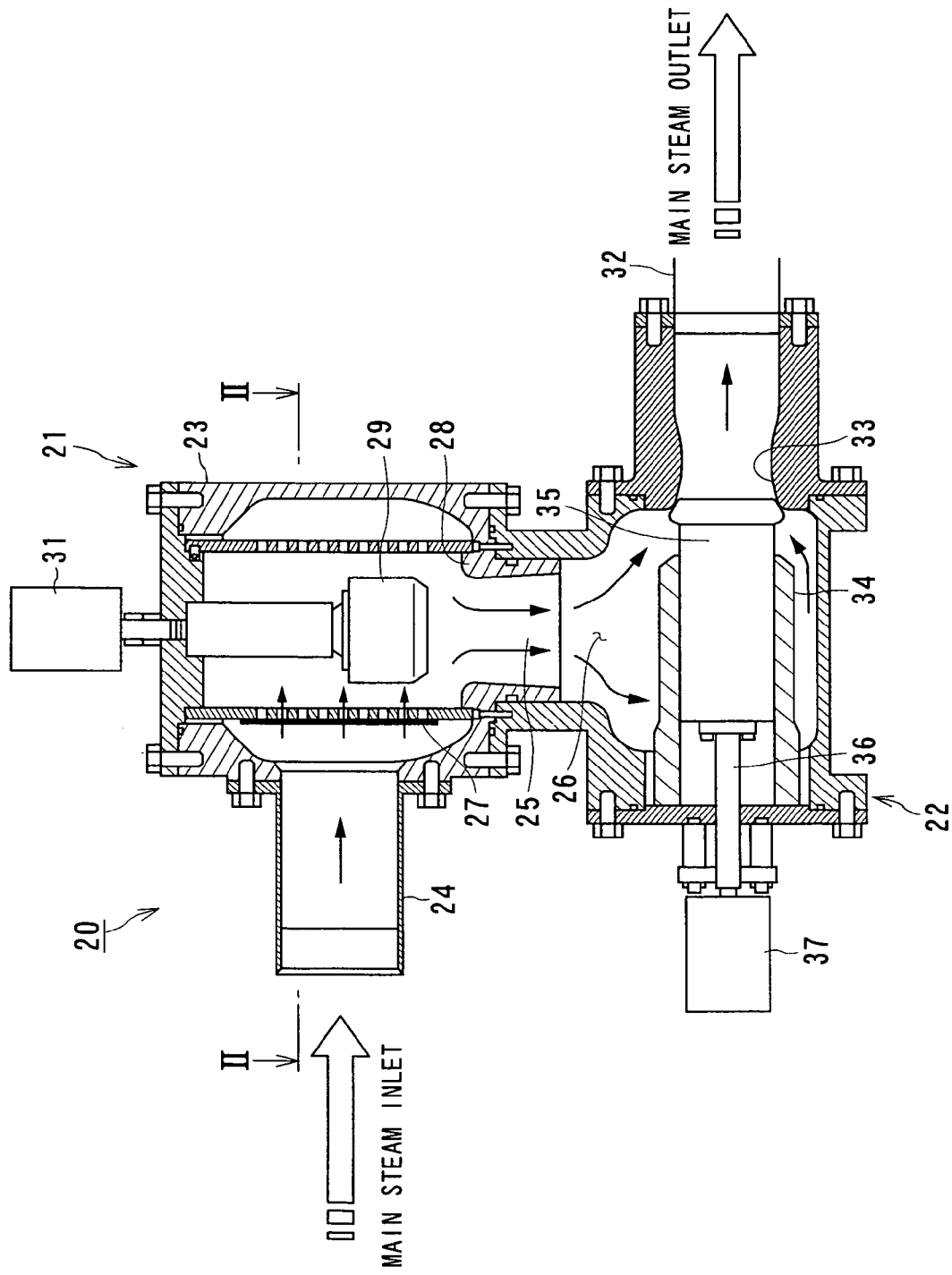
FIG. 1 is a schematic cross-sectional diagram showing a steam valve according to a first embodiment of the present invention.

Preferred embodiments of a steam valve according to the present invention will be described hereunder referring to the drawings and reference numerals therefor.

FIG. 1 shows a first embodiment of the steam valve in accordance with the present invention.

A steam valve 20 with respect to the first embodiment is composed of a main steam shut-off valve and a steam control valve (steam flow regulation valve) combined with each other, in which a first valve device 21 that corresponds to the main steam shut-off valve is disposed at an upstream side and a second valve device 22 that corresponds to the steam control valve (steam flow regulation valve) is disposed at a downstream side of the main steam, and in addition, the first valve device 21 and the second valve device 22 are housed in one valve casing 23.

The first valve device 21 is provided with a first main steam inlet 24 in the valve casing 23 and a first main steam outlet 25 that is connected to a second main steam inlet 26 of the second valve device 22, and houses therein a strainer 27 for removing impurities such as oxidized scale and the like.

Further, the first valve device 21 is provided with a first valve body 29 that detachably contacts a first valve seat 28 provided at a side of the first main steam outlet 25, and a first driving device 31 driving the first valve body 29 to travel forward and backward via a first valve rod 30. At this moment, the first driving device 31 driving the first valve body 29 to travel forward and backward is disposed in a direction crossing an axial line of the first steam inlet 24 and outside of the valve casing 23. This is because a larger space for a path for the main steam to flow is obtained in the valve casing 23 and a pressure loss of the main steam is decreased.

On the other hand, the second valve device 22 is provided with a second main steam outlet 32 disposed downstream from the valve casing 23, a second valve body 35 that detachably contacts a second valve seat 33 provided at a side of the second main steam outlet 32, and that slides a sleeve 34, and a second driving device 37 driving the second valve body 35 to travel forward and backward via a second valve rod 36.

Figure 2:
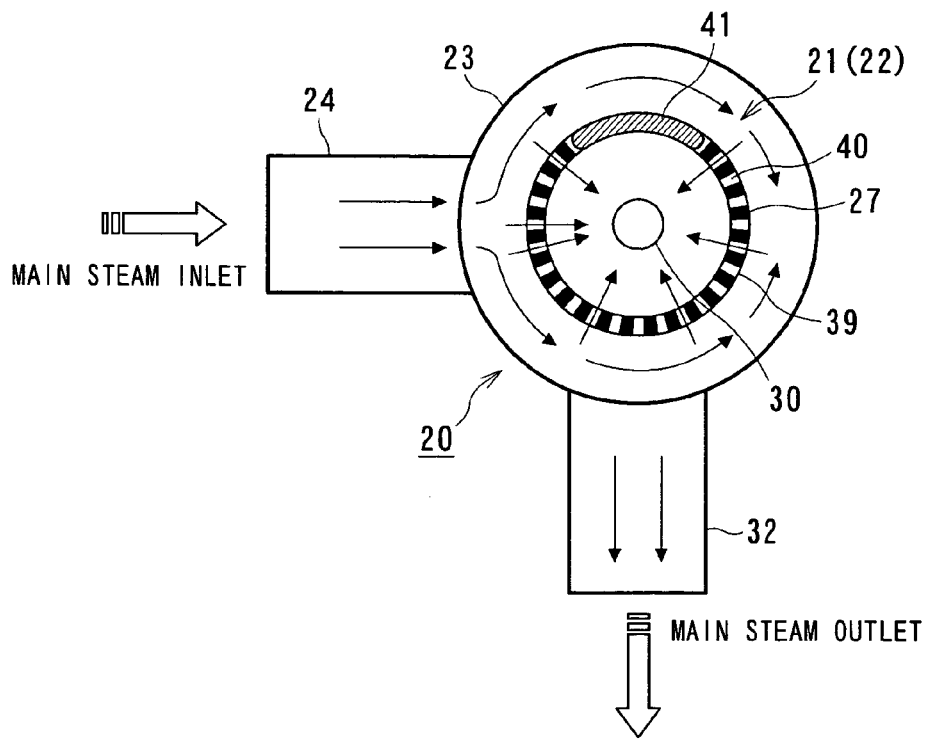
FIG. 2 is a cutaway cross-sectional diagram of FIG. 1 looking from the direction of arrows II-II.

On the other, in the strainer 27 provided in the first valve device 21 housed in the valve casing 23, tiny passing-through holes 40 which guide the main steam from outside to inside are formed in a cylindrical wall 39 of a cylindrical element 38 such as, for example, a cylinder or the like along a shaft length direction of the first valve rod 30, as shown in FIG. 2. In addition, a closing portion 41 that blocks the main steam flow is provided at a part of the cylindrical wall 39, for example, at a position opposite to the side of the second main steam outlet 32 of the second valve device 22 along the shaft length direction of the first valve rod 30.

Figure 17:
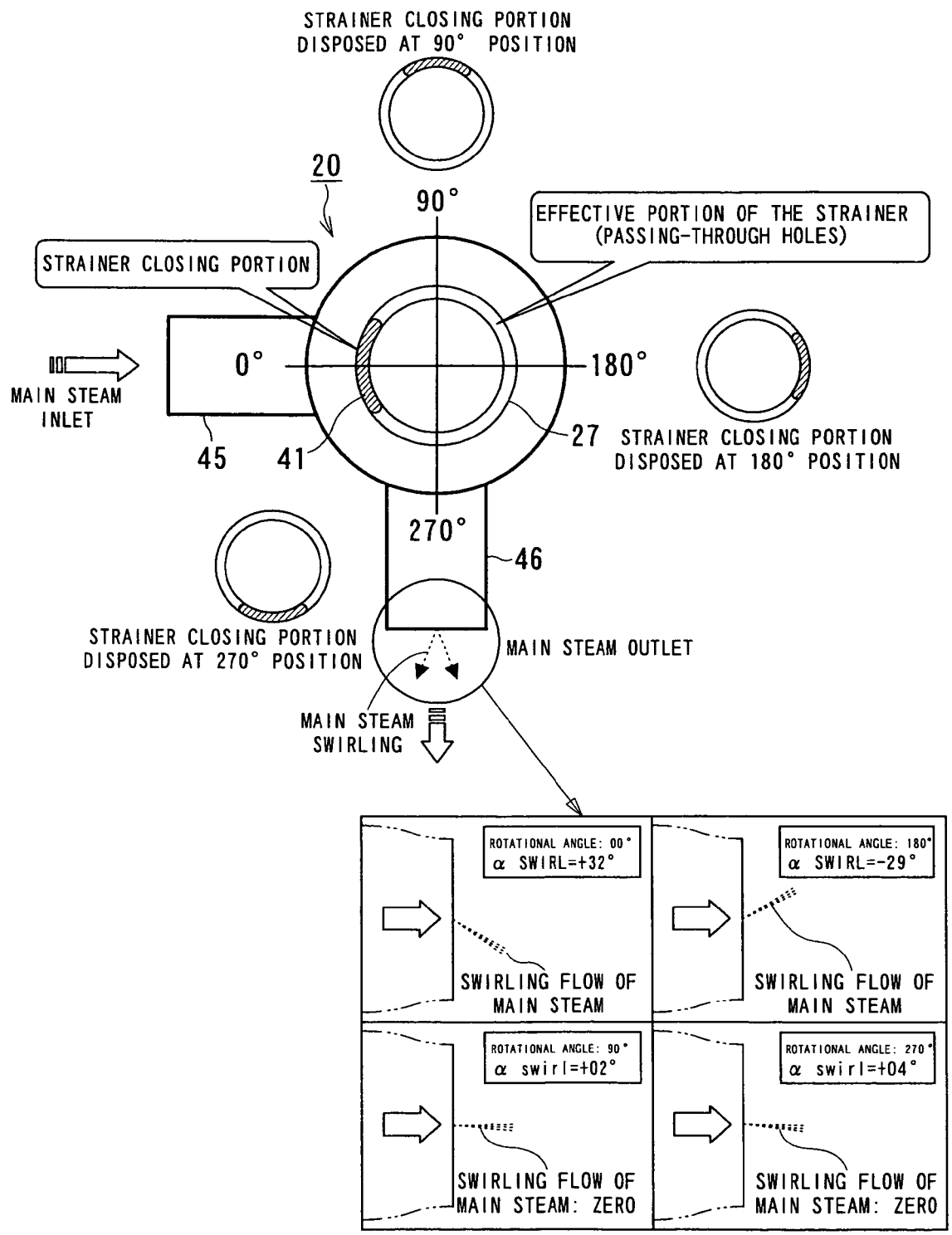
FIG. 17 is an explanatory illustration showing a position of the closing portion provided in the strainer and presence or absence of a swirl angle that occurs in the main steam in the steam valve in accordance with the present invention.
Figure 18:
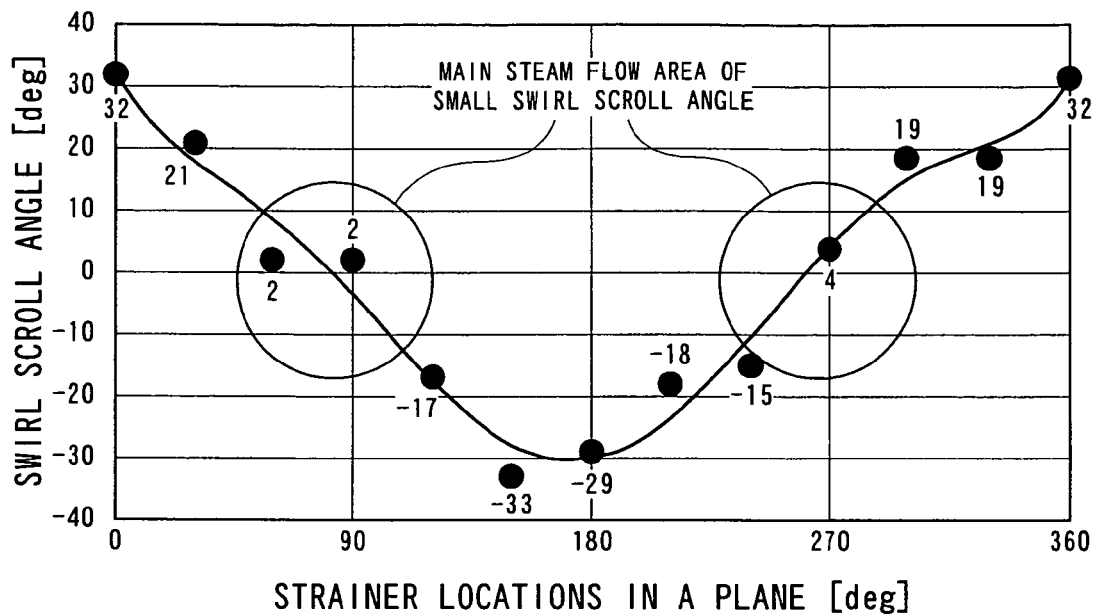
FIG. 18 is a diagrammatic view showing the swirl angle of the main steam when the strainer is developed in a plane in the steam valve in accordance with the present invention.
Figure 19:
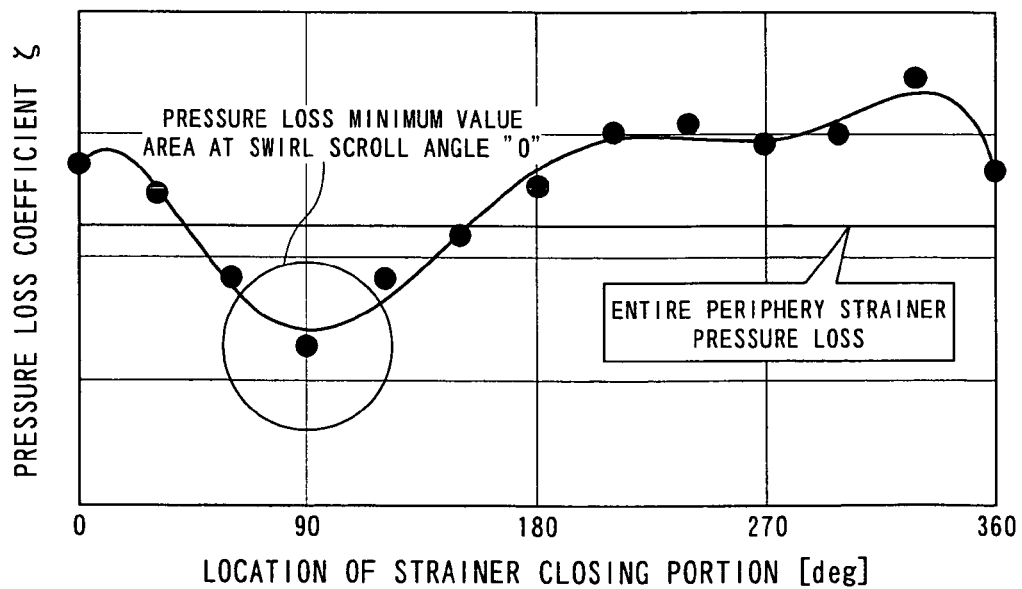
FIG. 19 is a diagrammatic view showing the relationship between the position of the closing portion provided in the strainer and the pressure loss in the steam valve in accordance with the present invention.

In the steam valve 20 having such a configuration as mentioned above, a relationship between a position of the closing portion 41 provided at the strainer 27 and the pressure loss of the main steam is explained referring to FIGS. 17 through 19. At this moment, FIG. 17 is an illustration showing positions of a closing portion provided in the strainer 27 and the presence or absence of a swirl angle that occurs in the main steam, and FIG. 18 is a diagram showing the swirl angle of the main steam when the strainer 27 is developed in a plane. In addition, FIG. 19 is a diagram showing a relationship between the position of the closing portion 41 provided in the strainer 27 and the pressure loss.

In the steam valve 20, when a position of the closing portion 41 provided at the side of the main steam inlet 45 of the strainer 27 that is set as a base is defined as 0°, the position opposite to the side of the main steam outlet 46 is defined as 90°, the position opposite to the side of the main steam inlet 45 is defined as 180°, and a position of the closing portion 41 provided at the side of the main steam outlet 46 is defined as 270°, as shown in FIG. 17, an experiment has shown that a swirling flow of the main steam is zero when respective positions of the closing portion 41 are 90° and 270°. FIG. 18 is a schematic view showing the swirl angle in which data obtained by the experiment are plotted, and it is shown that the swirl angle of the main steam has occurred at each of the positions except the 90° position and the 270° position, which serve as boundaries.

Further, when the relationship between the position of the closing portion 41 provided at the strainer 27 and the pressure loss is examined experimentally, it is found that the pressure loss of the main steam is indicative of a minimum value when the closing portion 41 is disposed at the 90° position, as shown in FIG. 19.

Thus, the steam valve 20 in accordance with the present invention is configured such that the passing-through holes 40 are formed in the cylindrical wall 39 of the strainer 27 of the first valve device 21 housed in the valve casing 23, and the closing portion 41 is formed at a rest part of the cylindrical wall 39 at a position opposite to the side of the second main steam outlet 32. In addition, the steam valve 20 is also configured such that the closing portion 41 blocks the other main steam to flow into the area where the deficiency of the speed of secondary flow exists due to the drift of the main steam that is headed from outside of the cylindrical wall 39 to the inside thereof. Therefore, the pressure loss caused by the swirling flow of the main steam can be further suppressed.

Further, the steam valve 20 of the present embodiment can suppress the occurrence of vibrations based on an unstable flow caused by the swirling flow of the main steam, being coupled with a reduction of noise by further reducing the pressure loss of the main steam.

Figure 3:
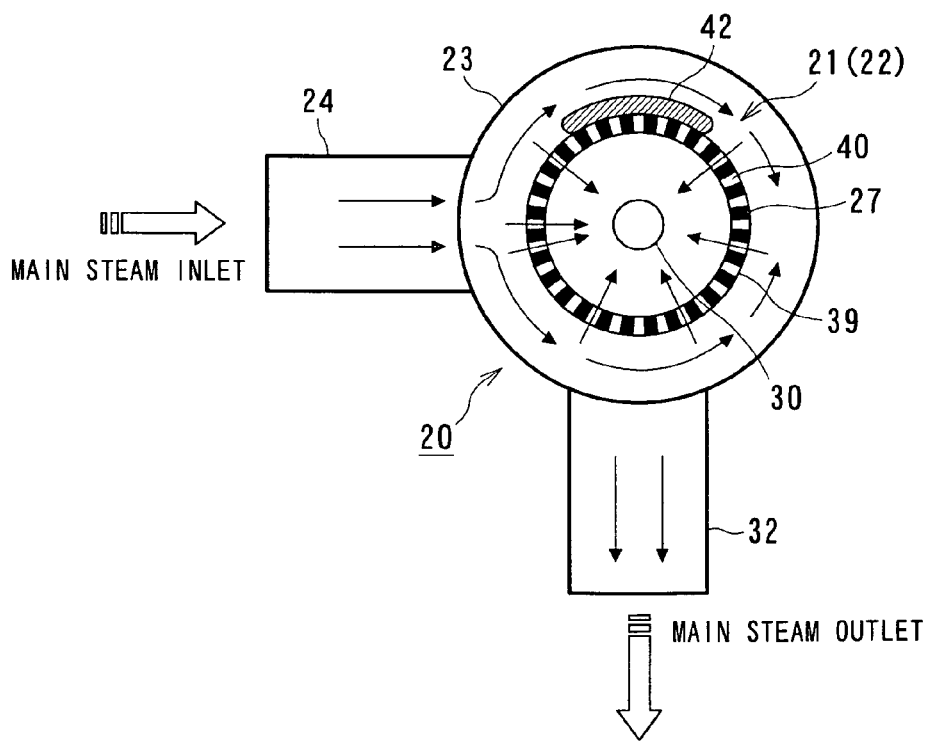
FIG. 3 is a conceptual plan view showing a steam valve according to a second embodiment of the present invention.

Furthermore, in the present first embodiment, the closing portion 41 is formed in the cylindrical wall 39 at the position opposite to the side of the second main steam outlet 32 of the second valve device 22. However, without being limited to the present embodiment, and instead of the closing portion 41, for example, as shown in FIG. 3, an interruption plate 42 may be mounted on the cylindrical wall 39 having the passing-through holes 40 at a position outside the cylindrical wall 39 and opposite to the side of the second main steam outlet 32.

Figure 4:
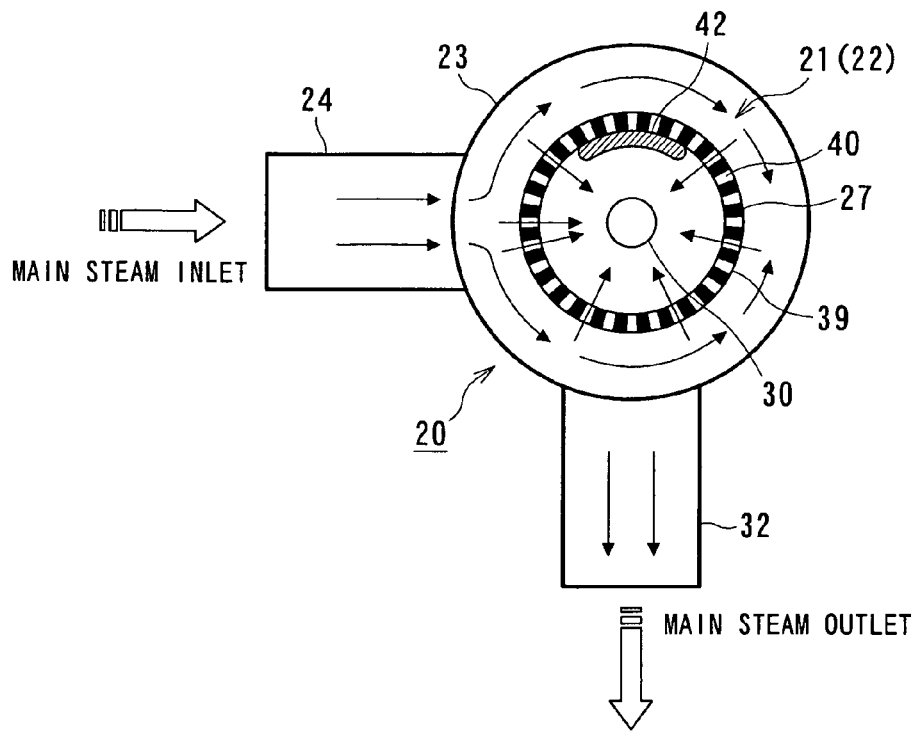
FIG. 4 is a conceptual plan view showing a steam valve according to a third embodiment of the present invention.

In addition, for example, as shown in FIG. 4, the interruption plate 42 may be mounted inside the cylindrical wall 39 having the passing-through holes 40 and at the position opposite to the side of the second main steam outlet 32.

Figure 5:
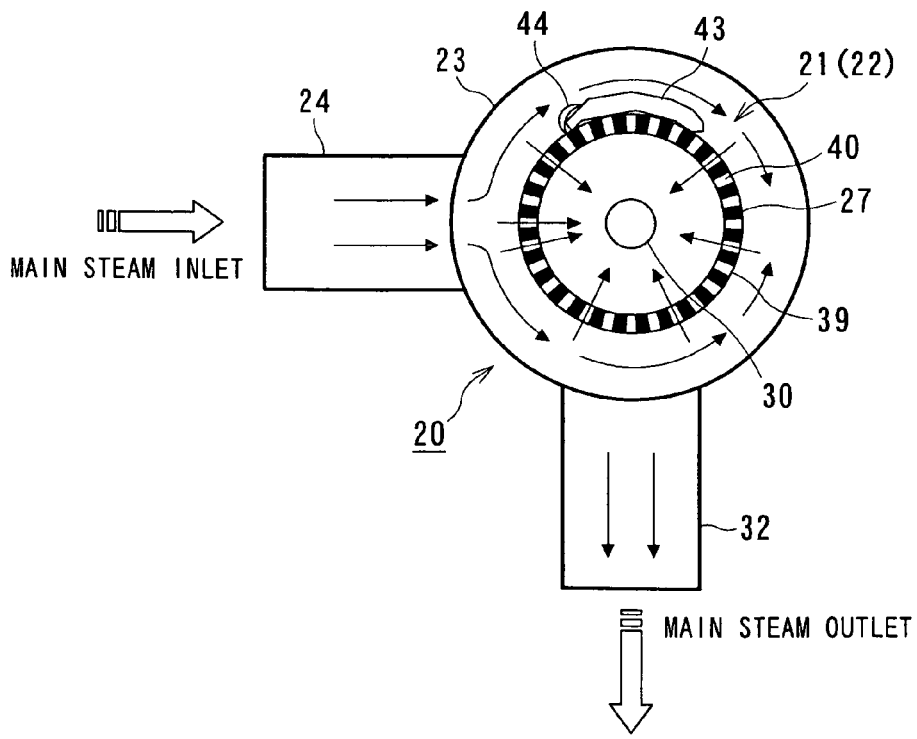
FIG. 5 is a conceptual plan view showing a steam valve according to a fourth embodiment of the present invention.

Further, for example, as shown in FIG. 5, a wing-shaped guide plate 44 (for example) may be provided outside the cylindrical wall 39 having the passing-through holes 40 and at the side opposite to the second main steam outlet 32 of the second valve device 22. When the guide plate 44 is provided, although a main steam peel-off (separation) area 43 is created, it does not result in an increased pressure loss of the strainer as a whole, because the peel-off area is an area with little pressure loss.

Figure 6:
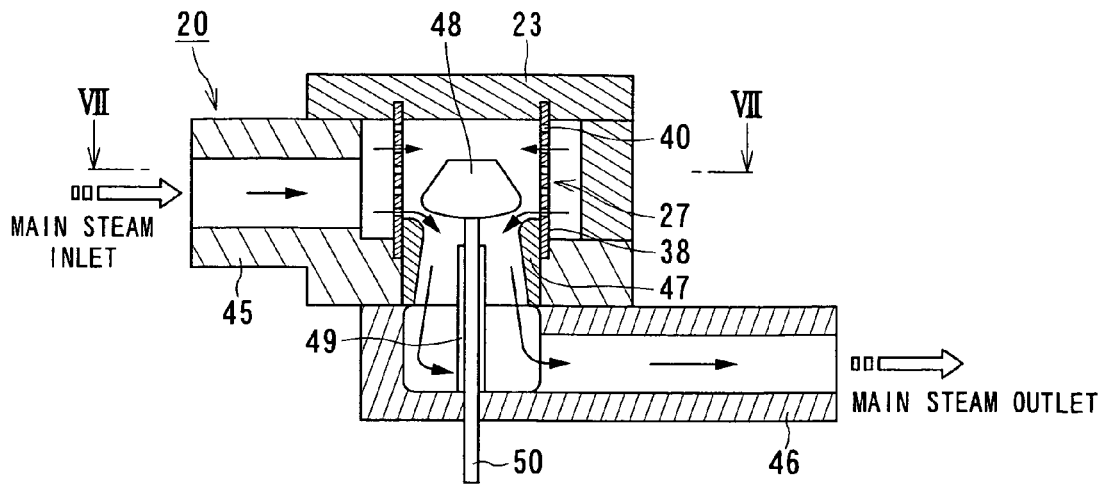
FIG. 6 is a conceptual diagram showing a steam valve according to a fifth embodiment of the present invention.
Figure 7:
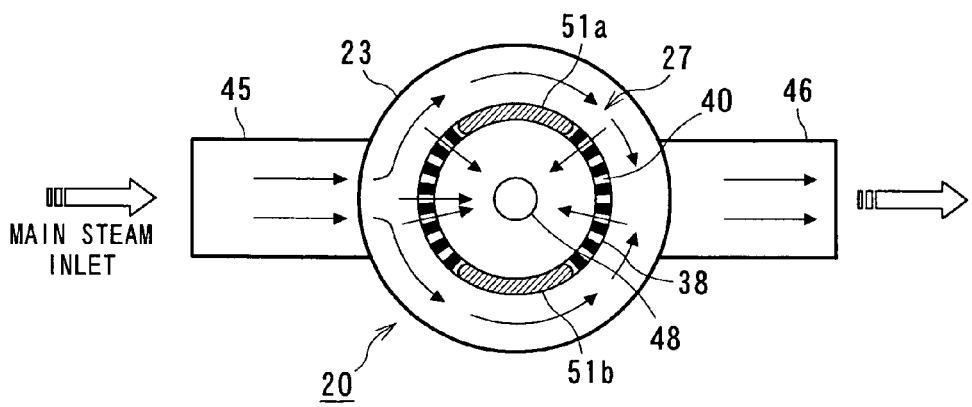
FIG. 7 is a cutaway cross-sectional diagram of FIG. 6 looking from the direction of arrows VII-VII.

FIGS. 6 and 7 are conceptual diagram showing the steam valve with respect to a fifth embodiment of the present invention.

In addition, FIG. 6 is a vertical cross-sectional diagram showing the steam valve in accordance with the present invention and FIG. 7 is a cutaway cross-sectional diagram of FIG. 6 looking from the direction of arrows VII-VII.

Further, the same reference numerals designate corresponding constituent elements in the first embodiment.

The steam valve 20 with respect to the present fifth embodiment is composed of the valve casing 23 respectively provided with the main steam inlet 45 at one side and the main steam outlet 46 provided in parallel with the main steam inlet 45 at another side, i.e., the opposite side, the strainer 27 formed of, for example, the cylindrically shaped cylindrical element 38 having a plurality of tiny passing-through holes 40, the valve body 48 that detachably contacts the valve seat 47, and the valve rod 50 driving the valve body 48 to freely travel forward and backward.

Further, the strainer 27 is provided with closing portions 51a and 51b in a direction orthogonally crossing axial lines of each of the main steam inlet 45 and the main steam outlet 46, as shown in FIG. 7.

Thus, the steam valve 20 with respect to the present embodiment is configured such that the passing-through holes 40 are formed in the strainer 27 housed in the valve casing 23, and the strainer 27 is provided with the closing portions 51a and 51b in a direction orthogonally crossing axial lines of each of the main steam inlet 45 and the main steam outlet 46, and that the closing portions 51a and 51b block the other main steam to flow into the area where the deficiency of the speed of secondary flow based on the drift of the main steam that flows from outside of the strainer 27 toward inside thereof exists. As a result, the pressure loss caused by the swirling flow of the main steam can be further suppressed.

Figure 8:
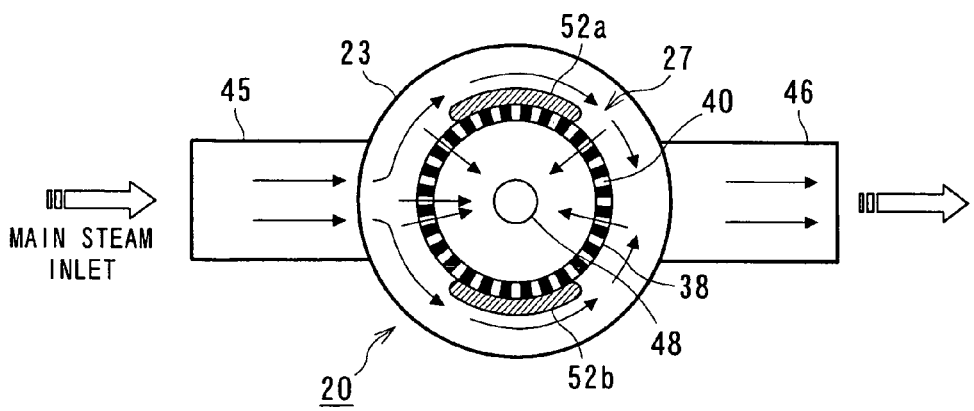
FIG. 8 is a conceptual plan view showing a steam valve according to a sixth embodiment of the present invention.

Further, in the present embodiment, the closing portions 51a and 51b are disposed in a direction orthogonally crossing the axial line of each of the main steam inlet 45 and the main steam outlet 46. However, without being limited to the present embodiment, for example, interrupting plates 52a and 52b that close a part of the passing-through holes 40 of the strainer 27 may be disposed at a position orthogonally crossing an axial line of each of the main steam inlet 45 and the main steam outlet 46 and outside of the strainer 27, instead of the closing portions 51a and 51b, as shown in the sixth embodiment in FIG. 8.

FIG. 9 is a conceptual diagram showing the steam valve with respect to seventh embodiment in accordance with the present invention. FIG. 9A in FIG. 9 is a conceptual plan view showing the steam valve when the closing plate mounted on the strainer is moved to a position facing the main steam inlet in an unsteady operation, and FIG. 9B is a conceptual plan view showing the steam valve when the closing plate mounted on the strainer is moved to the position opposite to the side of the main steam outlet in a steady operation. Further, the same reference numerals denote corresponding constituent elements in the first embodiment.

The steam valve 20 with respect to the present embodiment is configured such that the closing plate 53 provided in the strainer 27 is rotatably positioned in a circumferential direction, and at a time of the unsteady operation, the closing plate 53 is disposed at a position facing the main steam inlet 45, as shown in FIG. 9A and at a time of the steady operation, the closing plate 53 is disposed at the position opposite to the side of the main steam outlet 46, as shown in FIG. 9B.

Thus, in the present embodiment, the closing plate 53 provided in the strainer 27 is configured to be able to rotatably move along a circumferential direction, and when, in the unsteady operation, the closing plate 53 is disposed at the position facing the mine steam inlet 45, and on the other hand, when, in the steady operation, the closing portion 53 is disposed at the position opposite to the side of the main steam outlet 46. Accordingly, when in the unsteady operation, the impurities such as oxidized scale and the like that further occur are prevented from flowing inside the strainer 27 and damage to the steam turbine caused by the impurities can be prevented, and on the other hand, when, in the steady operation, the other main steam is prevented from flowing into the area where the deficiency of the speed of secondary flow exists due to the drift of the main steam that is headed from outside of the strainer 27 to inside. As a result, the pressure loss caused by the swirling flow of the main steam can be further suppressed.

Figure 10:
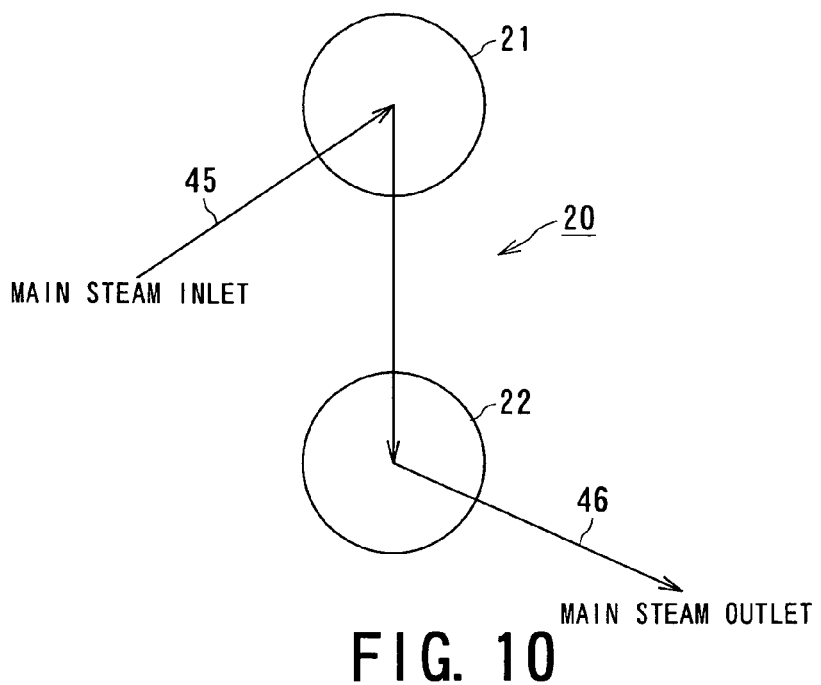
FIG. 10 is a conceptual diagram showing a steam valve according to an eighth embodiment of the present invention.

FIG. 10 is a conceptual vertical cross-section showing the steam valve according to the eighth embodiment of the present invention. Further, the same reference marks denote corresponding constituent elements in the first embodiment.

The steam valve 20 with respect to the present eighth embodiment is configured such that the first valve device 21 corresponding to the main steam shut-off valve is disposed at a side of the main steam inlet 14 and the second valve device 22 corresponding to the steam control valve to be connected to the first valve device 21 is disposed at a side of the main steam outlet 46. In addition, the first valve device 21 is formed into a vertical structure and the second valve device 22 is formed into a lateral structure.

Thus, the steam valve 20 with respect to the present embodiment is configured such that the first valve device 21 is disposed at the side of the main steam inlet 14 and the second valve device 22 to be connected to the first valve device 21 is disposed at the side of the main steam outlet 46, and in addition, the first valve device 21 is formed into a vertical structure and the second valve device 22 is formed into a lateral structure. As a result, the pressure loss can be suppressed by decreasing the number of meander of the flow of main steam at a place from the main steam inlet 45 to the main steam outlet 46.

Figure 11:
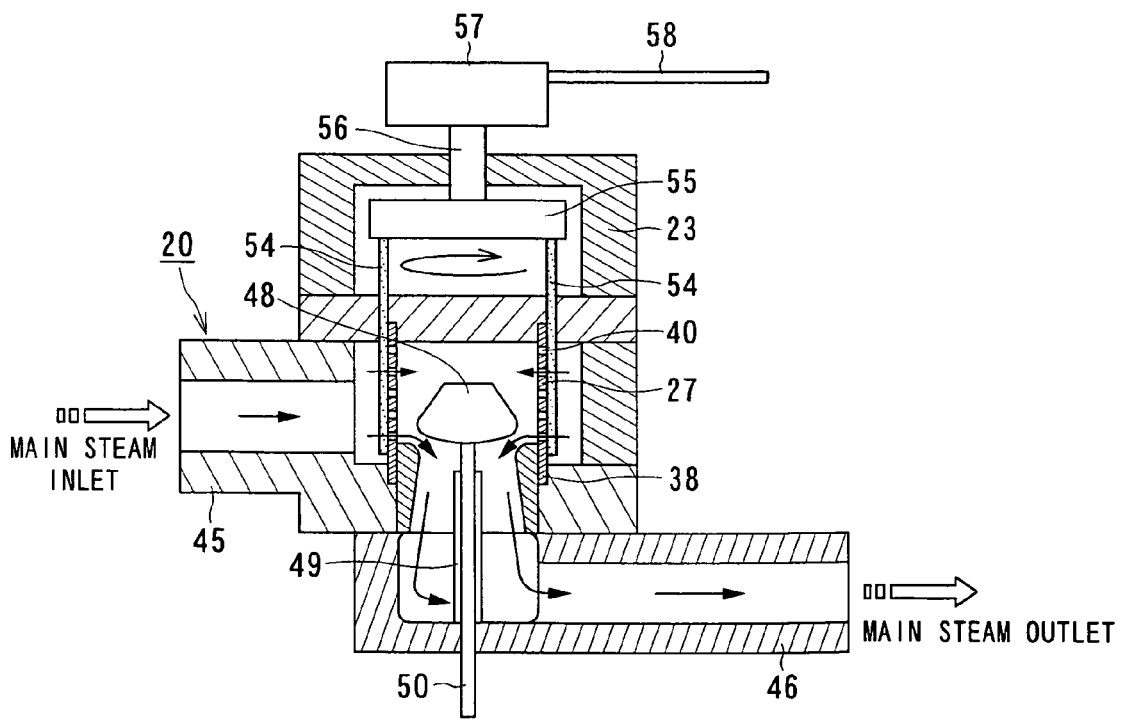
FIG. 11 is a schematic cross-sectional diagram showing a steam valve according to a ninth embodiment of the present invention.

FIG. 11 is a schematic cross-sectional diagram showing the steam valve according to the ninth embodiment of the present invention. Further, the same reference marks denote corresponding constituent elements in the first embodiment.

The steam valve 40 with respect to the present ninth embodiment is composed of the valve casing 23 provided with the main steam inlet 45 at one side and the main steam outlet 46 provided in parallel with the main steam inlet 45 at another side, i.e., the opposite side, respectively, the strainer 27 formed of, for example, the cylindrically shaped cylindrical element 38 having a plurality of tiny passing-through holes 40, the valve body 48 that detachably contacts the valve seat 47, the valve rod 50 driving the valve body 48 to freely travel forward and backward sliding in the sleeve 49, a rotating interruption plate 54 configured to surround the outside of the strainer 27 and rotates in a direction indicated by an arrow while interrupting a part of the passing-through holes 40, a supporting plate 55 supporting the rotating interruption plate 54, a driving device 57 giving rotation drive force to the supporting plate 55 via the rotating shaft 56, and a control command 58 that gives a drive directive to the driving device 57.

Thus, the steam valve 20 with respect to the present embodiment is provided with the rotating interruption plate 54 configured to surround the outside of the strainer 27 and rotates, while interrupting some of the passing-through holes 40, and a driving device 57 that gives rotation drive force to the rotating interruption plate 54 in response to a directive signal from a control section 58, and accordingly, in response to a driving condition of a plant, the passing-through holes 40 of the strainer 27 can be closed by arbitrarily changing a position of the passing-through holes 40 of the strainer 27 to be closed and the steam valve 20 can be responsive to the operation of the plant.

That is, the steam valve 20 can prevent further occurring impurities, such as oxidized scale and the like, from flowing into an internal portion of the strainer 27 by moving the rotating interruption plate 54 toward a position facing the main steam inlet 45 when in unsteady operation, and damage to the steam turbine caused by the impurities can be prevented.

Further, in the steady operation, the steam valve 20 can further suppress the pressure loss caused by the swirling flow of the main steam, by moving the rotating interruption plate 54 to a position through which the other main steam flows into the area where the deficiency of the speed of secondary flow exists due to the drift of the main steam that is headed from outside of the strainer 27 to the inside.

Figure 12:
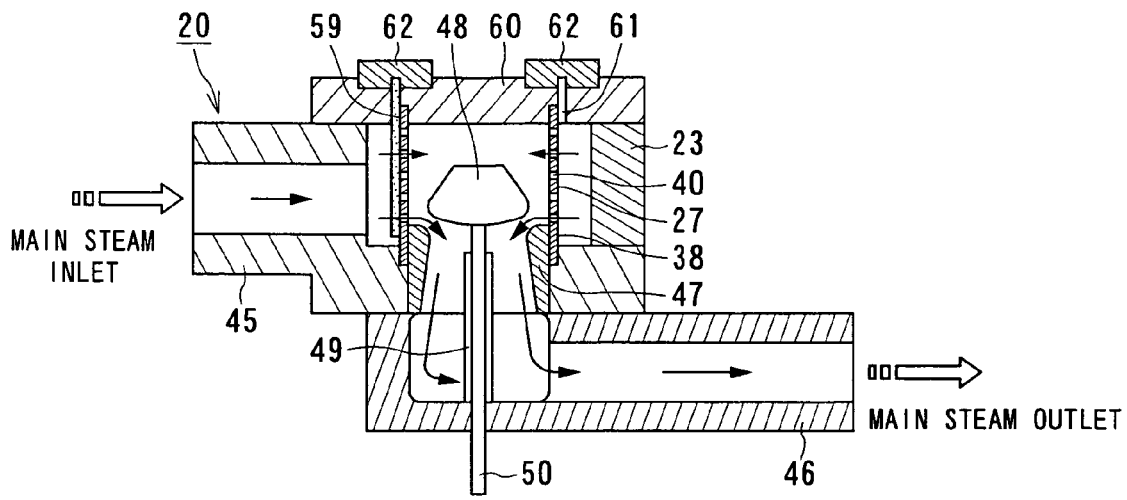
FIG. 12 is a schematic cross-sectional diagram showing a steam valve according a tenth embodiment of the present invention.

FIG. 12 is a schematic cross-sectional diagram showing the steam valve according to the tenth embodiment of the present invention. Further, the same reference marks denote corresponding constituent elements in the first embodiment.

The steam valve 20 with respect to the present tenth embodiment, having a composition approximately similar to that described in the ninth embodiment, is composed of the valve casing 23 provided with the main steam inlet 45 at one side and the main steam outlet 46 provided in parallel with the main steam inlet 45 at the other side, i.e., the opposite side, respectively, the strainer 27 formed of, for example, the cylindrically shaped cylindrical element 38 having a plurality of tiny passing-through holes 40, the valve body 48 that detachably contacts the valve seat 47, the valve rod 50 driving the valve body 48 to freely travel forward and backward sliding in the sleeve 49, an interruption plate 59 configured to close a part of the passing-through holes 40 of the strainer 27, a pressing plate 62 supporting and fixing the interruption plate 59 via a valve lid 60, and an insertion and pull-out path 61 which is formed on the valve lid 69 and by which interruption plate 59 can be freely inserted and pulled out.

Thus, the steam valve 20 with respect to the present embodiment is configured such that the valve lid 60 is provided with the interruption plate 59 that interrupts a part of the passing-through holes 40 of the strainer 27, and the insertion and pull-out path 61 that allows the interruption plate 59 to be detachable. Accordingly, the interrupting plate 59 can easily be dismantled and/or assembled and efforts of a worker can be further decreased.

Figure 13:
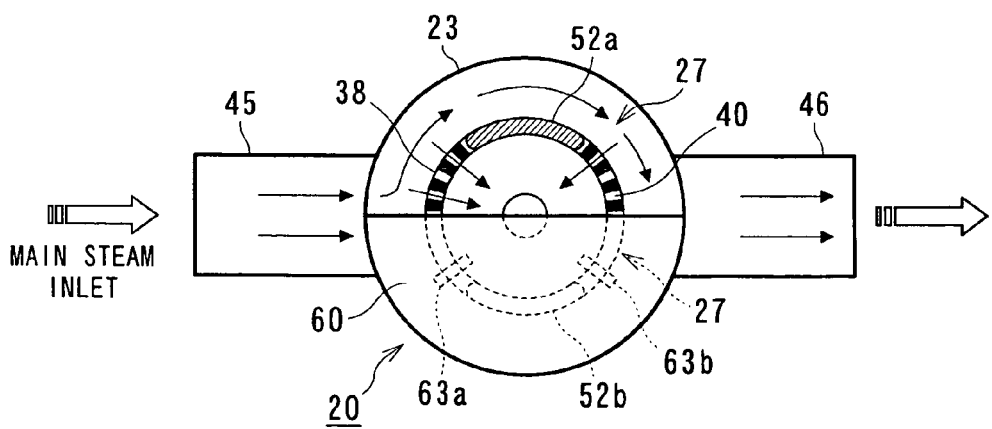
FIG. 13 is a partial cutaway cross-sectional plan view showing a steam valve according to an eleventh embodiment of the present invention.

FIG. 13 is a partial cutaway cross-sectional plan view showing the steam valve according to the eleventh embodiment of the present invention. Further, the same reference marks denote corresponding constituent elements in the first embodiment.

The steam valve 20 with respect to the present eleventh embodiment is provided with the valve casing 23 having the main steam valve 45 at one side and the main steam outlet 46 at the other side, i.e., opposite side, respectively, and the valve casing 23 houses the strainer 27 having the plurality of tiny passing-through holes 40 that is formed of, for example, the cylindrically shaped cylindrical element 38, and adjusting stoppers 63*a* and 63*b* mounted on the valve lid 60 and at outside of the strainer 27, which can move and adjust movements of the interruption plates 52*a* and 52*b* for interrupting a part of the passing-through holes 40 of the strainer 27 to positions within an appropriate area.

Thus, because the steam valve 20 with respect to the present embodiment is provided with the adjusting stoppers 63*a* and 63*b* on the valve lid 60, which move and adjust the movement of the interruption plates 52*a* and 52*b* that interrupt a part of the passing-through holes 40 of the strainer 27 to positions within an appropriate area, interrupting position for the main steam flowing from outside to inside of the strainer 27 can be adjusted at an appropriate position, and the occurrence of the swirling flow of the main steam can be suppressed, and thereby, the pressure loss based on the suppression of occurrence of the swirling flow of the main steam can be further decreased.

Figure 14:
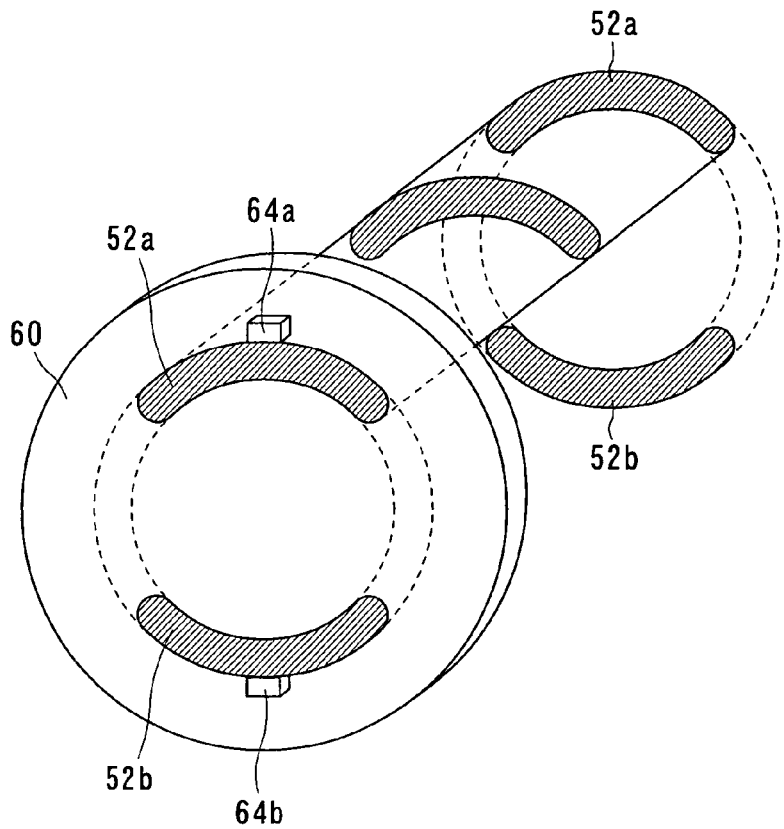
FIG. 14 is a schematic exploded perspective view showing a steam valve according to a twelfth embodiment of the present invention.

Further, the steam valve 20 with respect to the present embodiment is provided with the adjusting stoppers 63*a* and 63*b* to adjust the movement of the interruption plates 52*a* and 52*b* that interrupt a part of the passing-through holes 40 of the strainer 27 to a position within an appropriate area, and the adjusting stoppers 63*a* and 63*b* are mounted on the valve lid 60. However, without being limited to the present embodiment, for example, as described in twelfth embodiment shown in FIG. 14, the movement of the interruption plates 52*a* and 52*b* may be adjusted by forming fitting pieces 64*a* and 64*b* on the interruption plate 52*a* and 52*b* and by fitting the fitting pieces 64*a* and 64*b* into fitting holes (not shown) formed on the valve lid 60.

Figure 15:
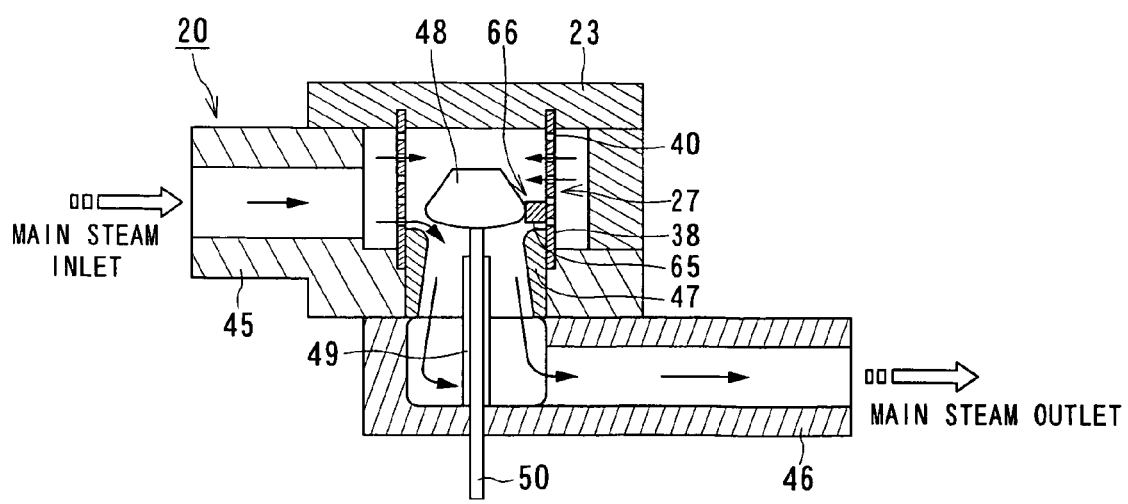
FIG. 15 is a schematic cross-sectional diagram showing a steam valve according to a thirteenth embodiment of the present invention.
Figure 16:
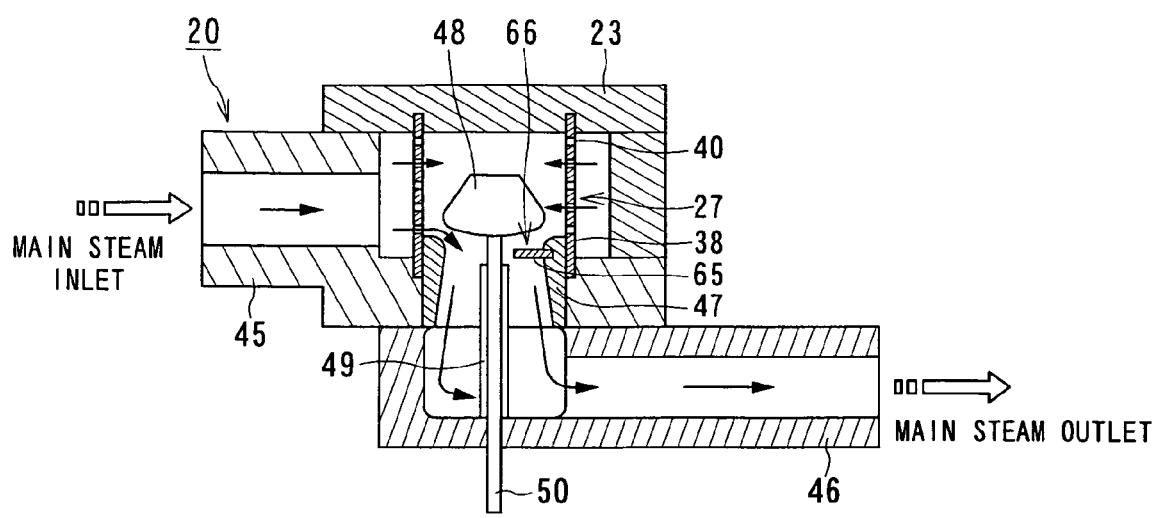
FIG. 16 is a schematic cross-sectional diagram showing a steam valve according to a fourteenth embodiment of the present invention.

FIG. 15 is a schematic cross-sectional diagram showing the steam valve with respect to the thirteenth embodiment in accordance with the present invention. Further, same reference marks denote corresponding constituent elements in the first embodiment.

The steam valve 20 with respect to the present thirteenth embodiment is composed of, as is approximately similar to the composition described in the ninth embodiment, the valve casing 23 provided with the main steam inlet 45 at one side and the main steam outlet 46 provided in parallel with the main steam inlet 45 at the other side, i.e., opposite side, the strainer 27 that is formed of, for example, the cylindrically shaped cylindrical element 38 having a plurality of tiny passing-through holes 40, the valve body 48 that detachably contacts the valve seat 47, the valve rod 50 driving the valve body 48 to freely travel forward and backward sliding in the sleeve 49, and in addition, for example, an interruption portion 66 made of a projecting piece 65 disposed upstream from the valve seat 47 at inside of the strainer 27 and at the position opposite to the side of the main steam inlet 45.

Thus, the steam valve 20 with respect to the present thirteenth embodiment is provided with the interruption portion 66 that is made of the projecting piece 65 and disposed upstream from the valve seat 47 inside the strainer 27 and at the position opposite to the side of the main steam inlet 45. Accordingly, the other main steam is prevented from flowing into the area where the deficiency of the speed of secondary flow based on the drift of the main steam flowing from outside of the strainer 27 toward inside thereof exists, and the pressure loss caused by the swirling flow of the main steam can be further suppressed.

Further, in the present embodiment, the interruption plate 66 is disposed upstream from the valve seat 47 in the strainer 27, and at the position opposite to the side of the main steam inlet 45. However, without being limited to the present embodiment, for example, as shown in the fourteenth embodiment of the sixteenth, for example, the interruption portion 66 made of the projection piece 65 may be disposed downstream from the valve seat 47.

Figure 20:
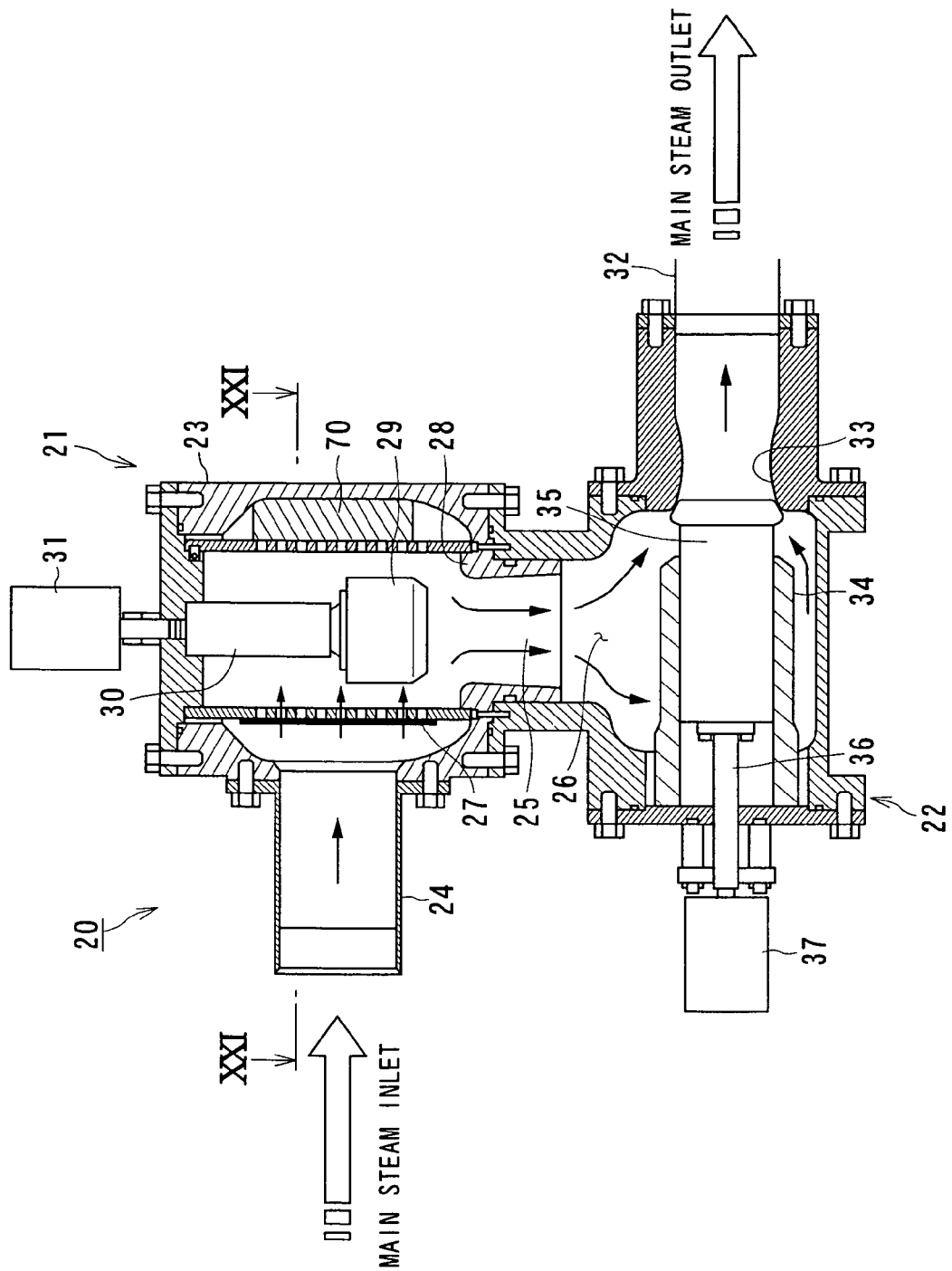
FIG. 20 is a schematic cross-sectional diagram showing a steam valve according to a fifteenth embodiment of the present invention.
Figure 21:
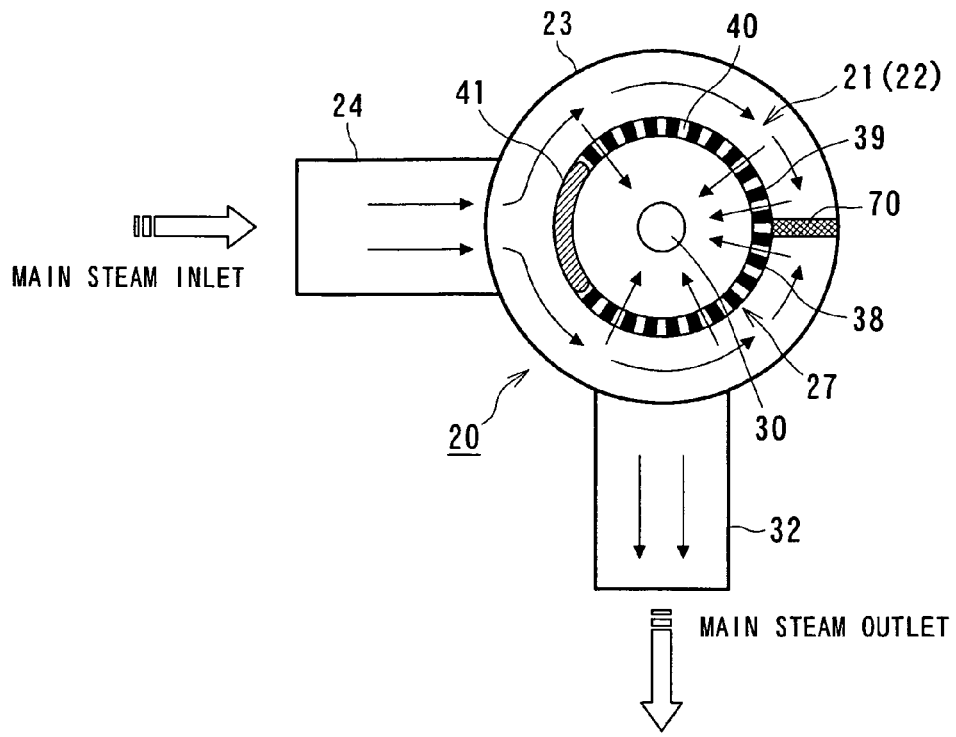
FIG. 21 is a cutaway cross-sectional diagram of FIG. 20 looking from the direction of arrows XXI-XXI.

FIG. 20 is a schematic cross-sectional diagram showing another embodiment (fifteenth embodiment) in accordance with the present invention, and as is described in the first embodiment shown in FIG. 1, the steam valve 20 with respect to the present embodiment is the steam valve in which the main steam shut-off valve and, for example, a steam control valve (steam flow regulation valve) are combined with each other, and in which the first valve device 21 corresponding to the main steam shut-off valve is disposed at the upstream side, and the second valve device 22 corresponding to the steam control valve (steam flow regulation valve) is disposed at a downstream side of the main steam, and in addition, the first valve device 21 and the second valve device 22 are housed in one valve casing 23. Accordingly, a redundant explanation of the embodiment shown in FIG. 1 will be omitted, using the same numerals.

In the fifteenth embodiment, the strainer 27 is provided with a bulkhead, i.e., partition, 70 disposed between the strainer 27 and the valve casing 23 along a shaft length direction of the first valve rod 30 such that a mixing loss caused by a collision between the two main steam flows, which have been separated by and come from the closing portion 41 flowing around the circumference of the strainer 27, is prevented and such that the main steam flow is turned. In addition, the bulkhead 70 is disposed at the position opposite to the side of the first main steam inlet 24.

In the thus configured steam valve 20, a relationship between the bulkhead 70 disposed at the strainer 27 and the pressure loss of the main steam will be explained using FIG. 29. Further, FIG. 29 is a pressure loss diagram showing a change of the pressure loss in response to increase and decrease of an opening amount of the valve (that corresponds to the first valve body 29) in each of a case when the bulkhead is in the presence and when the bulkhead is in the absence.

Figure 29:
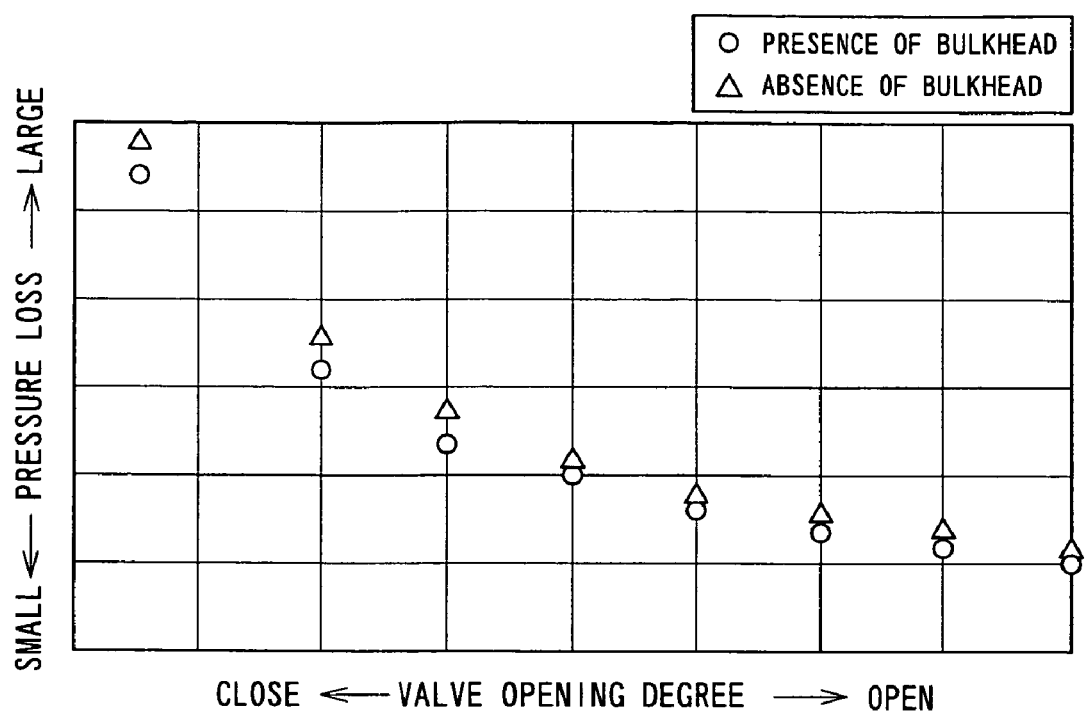
FIG. 29 is a diagram representing a pressure loss with respect to the valve opening, comparing the pressure loss in the valve casing provided with the bulkhead in the embodiment in accordance with the present invention to the valve casing of a prior art, which is not provided with the bulkhead.
Figure 30:
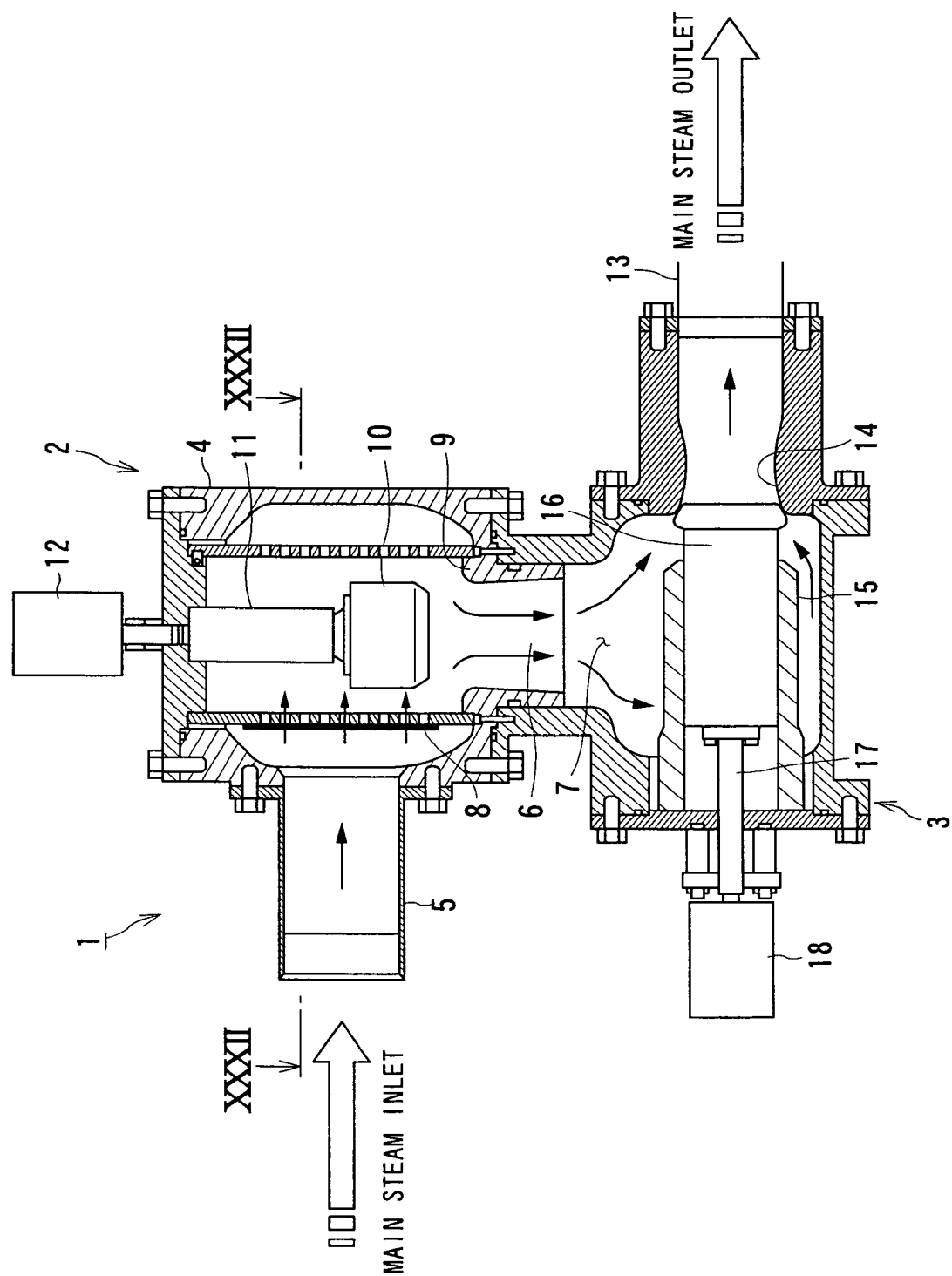
FIG. 30 is a schematic cross-sectional diagram showing the steam valve in accordance with the prior art.
Figure 31:
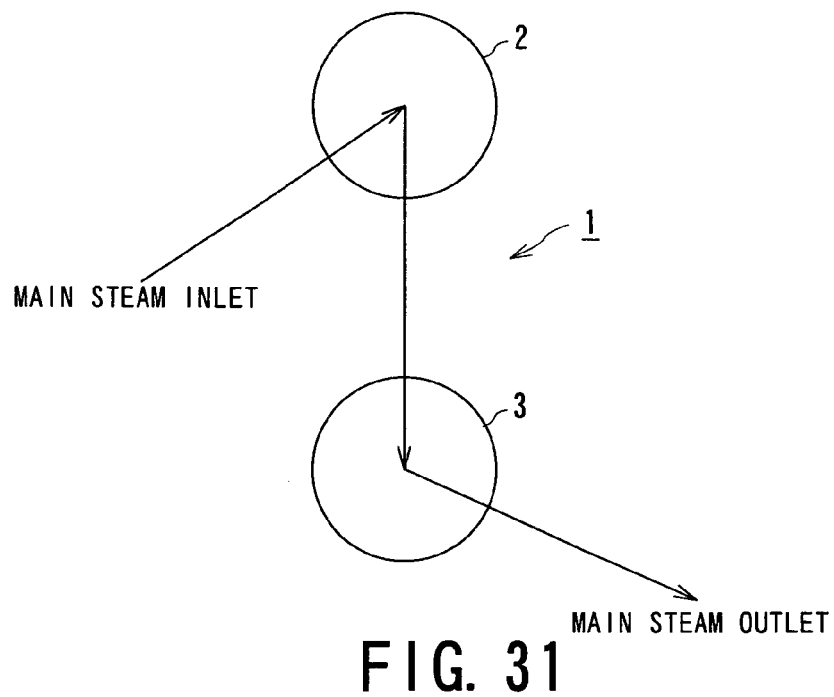
FIG. 31 is a conceptual diagram showing the steam valve incorporating valve devices having different functions and uses in accordance with the prior art.
Figure 32:
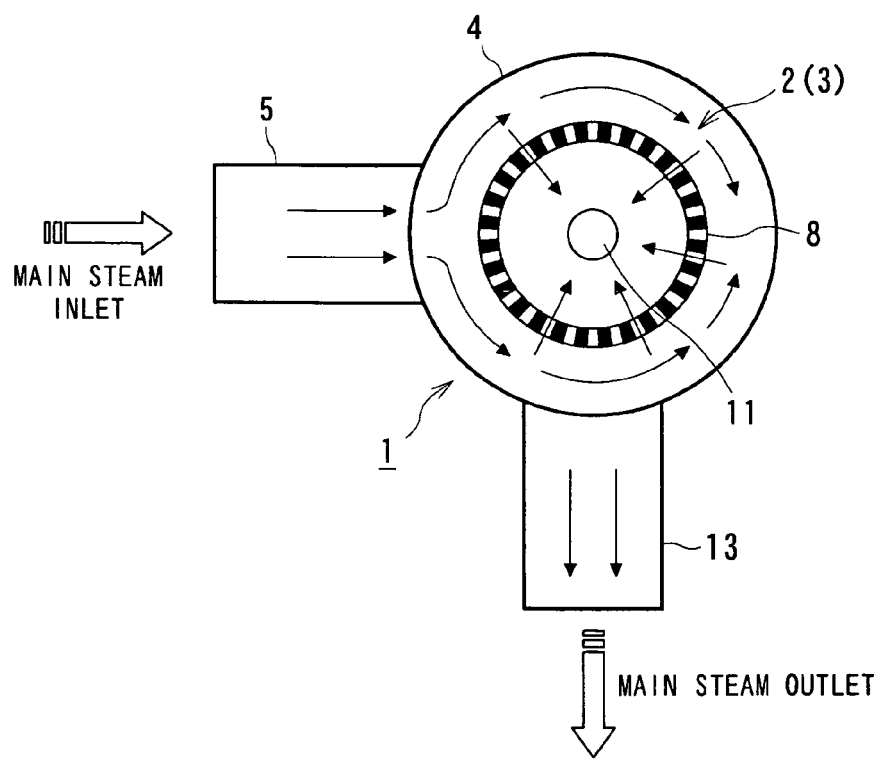
FIG. 32 is a cutaway cross-sectional diagram of FIG. 30 looking from arrows XXXII-XXXII direction.

An experiment has shown that when the strainer 27 is provided with the bulkhead 70 at the position opposite to the side of the first main steam inlet 24, the pressure loss is decreased in all over the entire opening amount of the valve compared to the case when the bulkhead is in the absence, as shown in FIG. 29.

As described above, the steam valve 20 with respect to the present embodiment is configured to dispose the bulkhead 70 between the strainer 27 and the valve casing 23 at the position opposite to the side of the first main steam inlet 24 along the shaft length direction of the first valve rod 30 and to prevent the collision between the two main steam flows, which have been separated by and come from the closing portion 41 disposed at the side of the inlet of the strainer 27, flowing around the circumference of the strainer 27. As a result, the pressure loss can be decreased by preventing the mixing loss caused by the collision of the two main steam flows.

Figure 22:
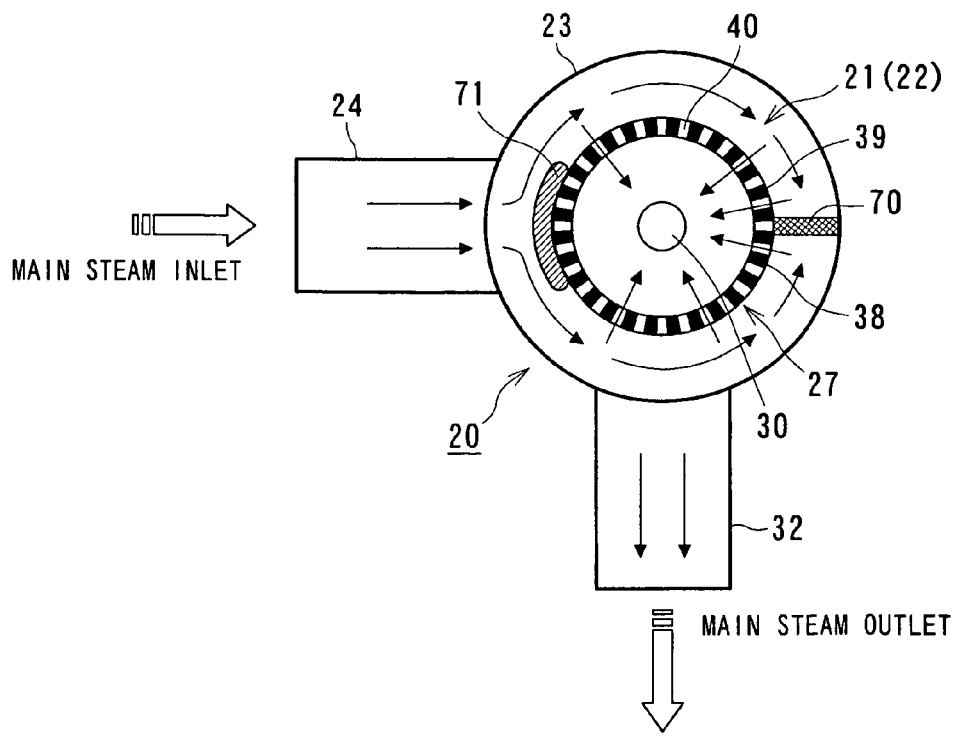
FIG. 22 is a conceptual plan view showing a steam valve according to a sixteenth embodiment of the present invention.

Further, in the present fifteenth embodiment, the strainer 27 housed in the valve casing 23 of the first valve device 21 is provided with the closing portion 41 on the cylindrical wall 39 at the side of the strainer 27 facing the first main steam inlet 24, and the bulkhead 70 is disposed between the strainer 27 and the valve casing 23 at the position opposite to the side of the closing portion 41. However, without being limited by the present embodiment, instead of the closing portion 41, for example, as described in the sixteenth embodiment shown in FIG. 22, an interruption plate 71 may be mounted on a side of the outer circumference of the cylindrical wall 39 of the strainer 27, and the bulkhead 70 may be disposed between a position opposite to the side of the interruption plate 71 and the valve casing 23.

Figure 23:
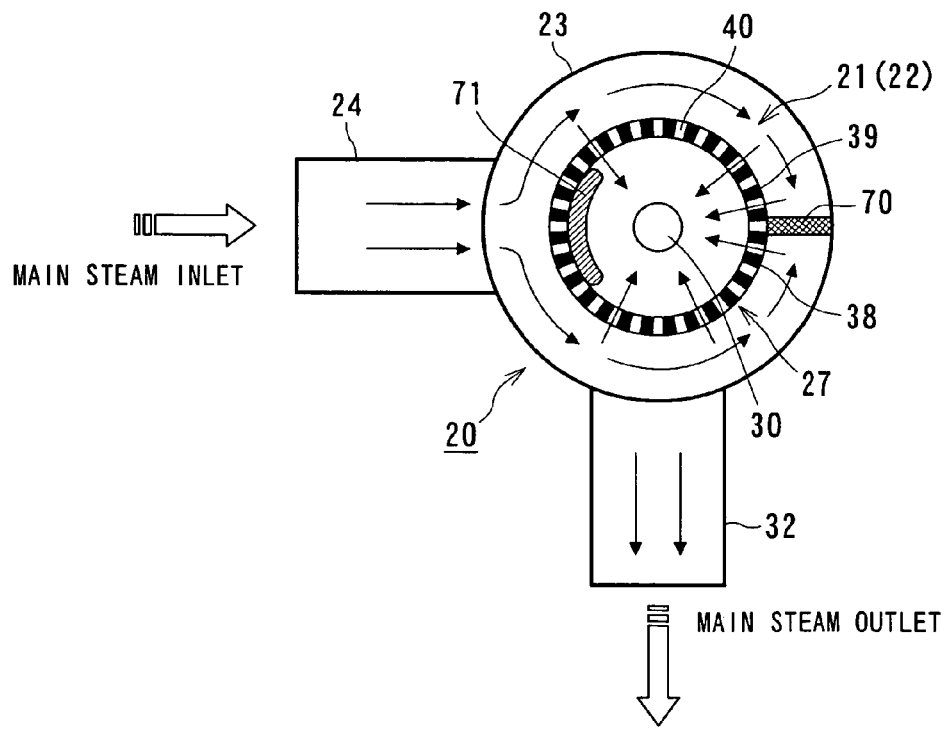
FIG. 23 is a conceptual plan view showing a steam valve according to a seventeenth embodiment of the present invention.

Further, for example, as described in the seventeenth embodiment shown in FIG. 23, the interruption plate 71 may be mounted on a side of an internal circumference of the cylindrical wall 39 having the passing-through holes 40 and at a side facing the first main steam inlet 24, and the bulkhead 70 may be disposed at a position between the position opposite to the side of the interruption plate 71 and the valve casing 23.

Figure 24:
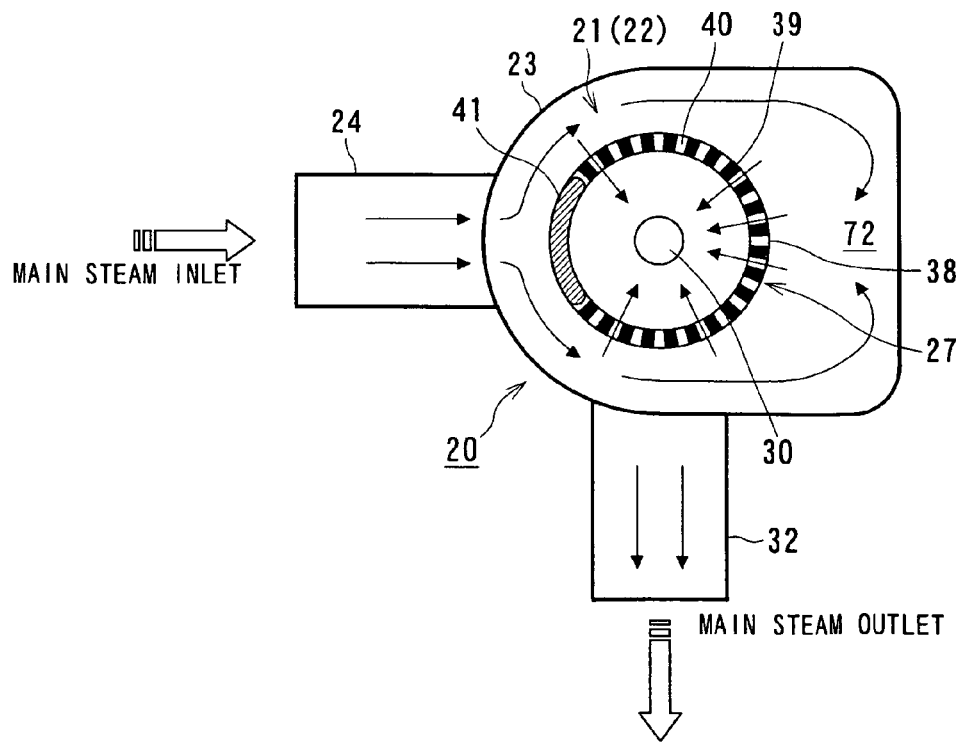
FIG. 24 is a conceptual plan view showing a steam valve according to an eighteenth embodiment of the present invention.

Furthermore, for example, as described in the eighteenth embodiment shown in FIG. 24, the valve casing 23 may be formed to a bell-shape, for example, and the closing portion 41 may be provided in the strainer 27 housed in the valve casing 23 at a side facing the first main steam inlet 24, and at the same time, a shape of the valve casing 23 at the position opposite to the side thereof may be broadened toward the end, as a pressure-recovering chamber 72.

Figure 25:
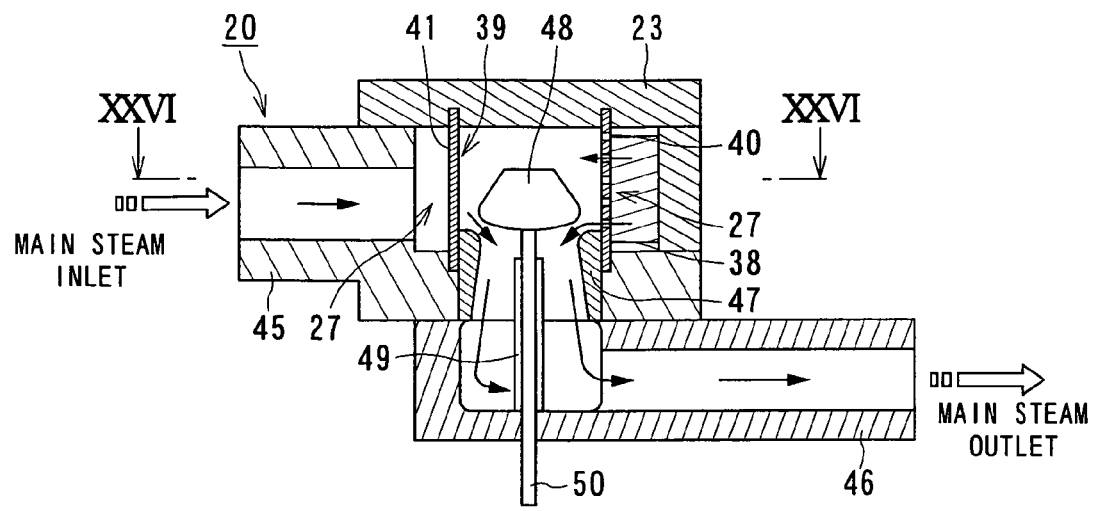
FIG. 25 is a schematic cross-sectional diagram showing a steam valve according to a nineteenth embodiment of the present invention.
Figure 26:
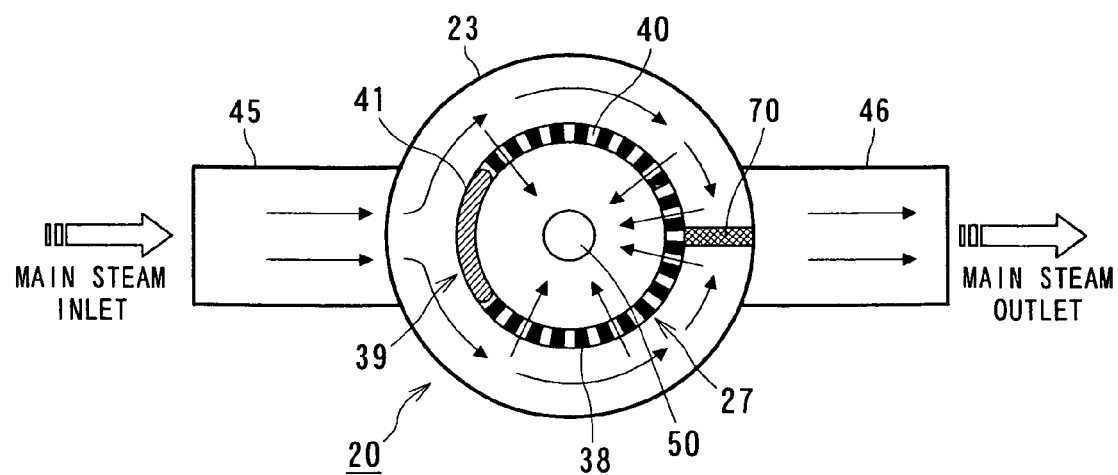
FIG. 26 is a cutaway cross-sectional diagram of FIG. 25 looking from the direction of arrows XXVI-XXVI.

FIGS. 25 and 26 are conceptual diagrams showing the steam valve with respect to the nineteenth embodiment in accordance with the present invention. In addition, the same marks are used for corresponding elements in the fifteenth embodiment.

The steam valve 20 with respect to the present nineteenth embodiment is composed of the valve casing 23 provided with the main steam inlet 45 at one side, and the main steam outlet 46 provided in parallel with the main steam inlet 45 at another side, i.e., opposite side, respectively, the strainer 27 formed of, for example, the cylindrically shaped cylindrical element 38 having a plurality of tiny passing-through holes 40, the valve body 48 that detachably contacts the valve seat 47, and the valve rod 50 that slides in the sleeve 49 and drives the valve body 48 to freely travel forward and backward. Further, the strainer 27 is provided with the closing portion 41 on the cylindrical wall 39 at the side facing the main steam inlet 45, and the bulkhead 70 disposed between the strainer 27 and the valve casing 23 at the position opposite to the side of the closing portion 41.

Thus, the steam valve 20 with respect to the present nineteenth embodiment houses the strainer 27 that is made as the cylindrically shaped cylindrical element 38 having the passing-through holes 40 in the cylindrical wall 39 in the valve casing 23, and the steam valve 20 is provided with the closing portion 41 in the cylindrical wall 39 of the strainer 27 at a position facing the side of the main steam inlet 45. In addition, the steam valve 20 is configured such that the bulkhead 70 is disposed between the strainer 27 and the valve casing 23 at the position opposite to the side of the closing portion 41, and thereby, the collision between the two main steam flows, which have been separated by and come from the closing portion 41 flowing round, is prevented, and thereby, the mixing loss caused by the collision between the two main steam flows is prevented and the pressure loss can be decreased.

Figure 27:
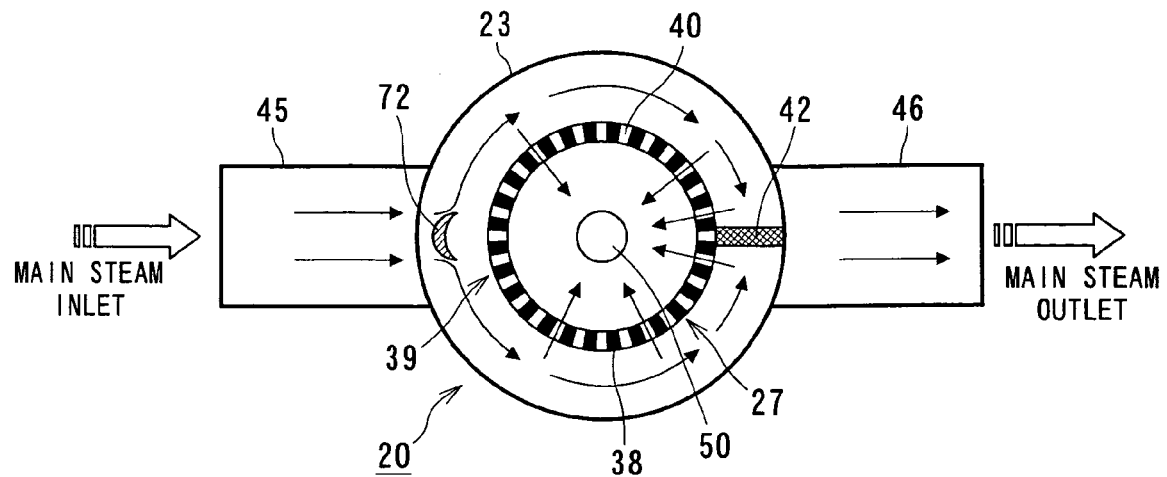
FIG. 27 is a conceptual plan view showing a steam valve according to a twentieth embodiment of the present invention.

Further, in the present embodiment, in the strainer 27 housed in the valve casing 23, the closing portion 41 is disposed at the cylindrical wall 39 at the side of the strainer 27 facing the main steam inlet 45, and in addition, the bulkhead 70 is disposed between the strainer 27 and the valve casing 23 at the position opposite to the side of the closing portion 41. However, without being limited to the present embodiment, instead of the closing portion 41, for example, as described in the twentieth embodiment shown in FIG. 27, for example, wing-shaped guide plate 72 may be provided at a position upstream from the strainer 27 and facing the main steam inlet 45.

Figure 28:
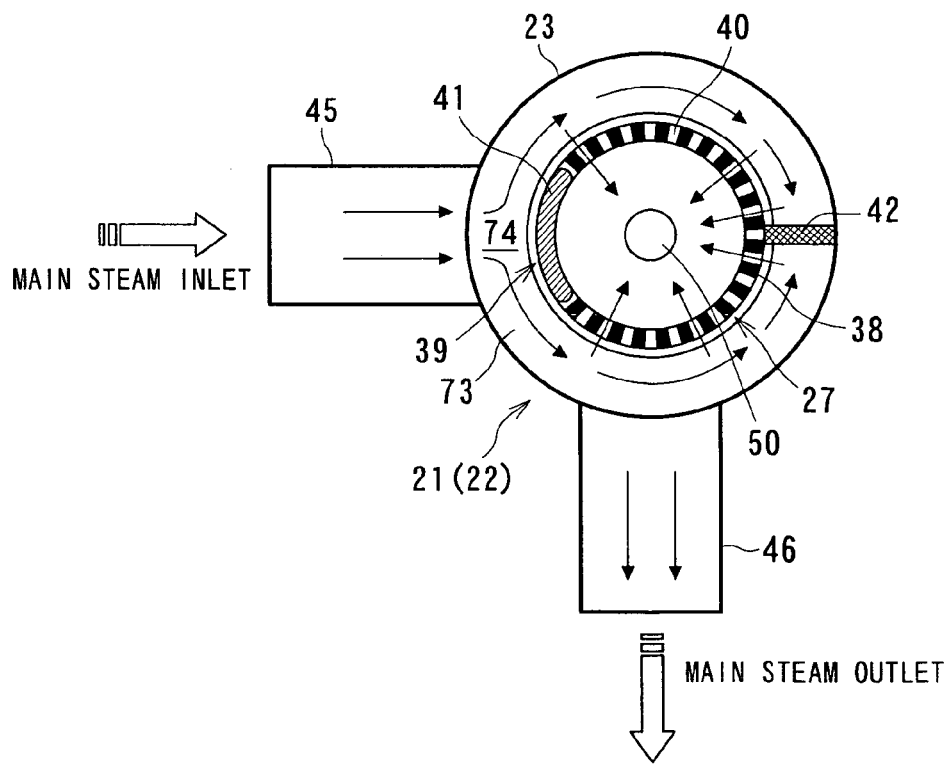
FIG. 28 is a plan view showing a steam valve according to a twenty-first embodiment of the present invention.

Furthermore, in the present embodiment, the closing portion 41 may be provided in the cylindrical wall 39 at the side facing the main steam inlet 45 of the strainer 27 housed in the valve casing 23, as described in the twenty-first embodiment in FIG. 28 (for example), instead of the nineteenth embodiment shown in FIGS. 25 and 26. In addition, the bulkhead 70 may be disposed between the strainer 27 and the valve casing 23 at the position opposite to the side of the closing portion 41. On the other hand, a plurality of flow path partitions 73 may be provided in a space between the valve casing 23 and the strainer 27 along a shaft length (axially longitudinal) direction of the valve rod 50 at a predetermined distance, and entire circumference of the outside of the strainer 27, or predetermined part of the circumferential length in the entire circumference thereof may be partitioned to be a rack-like flow path 74 with the flow path partition 73.

In the present embodiment, when the entire circumference or the predetermined circumferential length of the strainer 27 is partitioned to be the rack-like flow path 74, a component of a speed of the main steam inlet 45 in the radial direction (a component of the speed of the main steam in the shaft length direction of the valve rod 50) is limited and thereby, a secondary flow loss can be suppressed.

Further, because the flow path partition 73 forming the rack-like flow path 74 serves as a heat transmission fin, a heat transfer between the main steam passing through the rack-like flow path 74 and the flow path partition 73 is enhanced and an equalization of the temperature of the entire valve can be aimed. Consequently, a warming up time for start-up can be reduced and a thermal stress can be relieved resulting in effective operation.

INDUSTRIAL APPLICABILITY

As described above, in the steam valve in accordance with the present invention, the valve devices provided with functions and uses different from each other are incorporated into one valve casing, and an installation space can thereby be further decreased. In addition, since the steam valve can respond to any one of starting operation, rated load operation, partly rated load operation, and emergency shutting-off operation, the present invention has large industrial applicability.

Further, the steam valve in accordance with the present invention is provided with a device housed in the valve casing to prevent a part of the main steam from flowing into a strainer in which the main steam flows from outside to inside thereof, and the device for blocking a part of the flow of the main steam is disposed at an appropriate position in the strainer. Therefore, the other main steam is prevented from flowing into an area where a deficiency of a speed of secondary flow based on a drift of the main steam that flows from outside of the strainer to inside thereof exists, and the pressure loss caused by a swirling flow of the main steam can be further suppressed.

In addition, the steam valve in accordance with the present invention can suppress occurrence of a vibration based on an unstable flow caused by the swirling flow of the main steam, being coupled with a reduction of noise. This is because the further reduction of the pressure loss of the main steam is aimed.

The steam valve in accordance with the present invention provided with the above described configuration and operational characteristics is preferably applicable, in particular, for steam turbine plants.

The invention claimed is:

1. A steam valve comprising:
a valve casing, including a main steam inlet portion and a main steam outlet portion;
a first valve device disposed at a main steam inlet portion side in the valve casing including a valve seat, a valve body, a valve rod and a driving device;
a second valve device disposed at a main steam outlet portion side in the valve casing including a valve seat, a valve body, a valve rod and a driving device;
a strainer housed in the valve casing, for surrounding the valve body of the first valve device, and
a closing portion provided in the strainer, for blocking a part of the main steam flow flowing from outside to inside,
wherein an axial direction of the main steam outlet portion projected on a plane perpendicular to the valve rod of the first valve device is provided so as to be perpendicular to an axial direction of the main steam inlet portion projected on the plane, the axial direction of the main steam outlet portion and the axial direction of the main steam inlet portion being parallel to the plane, and
wherein the closing portion provided in the strainer is disposed at a position opposite to a side of the main steam outlet portion projected on the plane.

2. The steam valve according to claim 1, wherein the closing portion is an interruption plate, and wherein the interruption plate is disposed at the position opposite to the side of the main steam outlet and outside the strainer.

3. The steam valve according to claim 1, wherein the closing portion is an interruption plate, and wherein the interruption plate is disposed at the position opposite to the side of the main steam outlet and inside the strainer.

4. The steam valve according to claim 1,
wherein the second valve device is formed into a lateral structure and disposed at a downstream side from the first valve device, while the first valve device is formed into a vertical structure and disposed at an upstream side of the main steam.

5. A steam valve comprising:
a valve casing, including a main steam inlet portion and a main steam outlet portion;
a first valve device disposed at a main steam inlet portion side in the valve casing including a valve seat, a valve body, a valve rod and a driving device;
a second valve device disposed at a main steam outlet portion side in the valve casing including a valve seat, a valve body, a valve rod and a driving device;
a strainer housed in the valve casing, for surrounding the valve body of the first valve device; and
a guide plate provided on the strainer, for creating a main steam peel-off area of a main steam flow flowing from outside to inside of the strainer for surrounding the first valve device.

6. The steam valve according to claim 5, wherein the guide plate for creating the main steam peel-off area is provided at the position opposite to the main steam outlet portion side and outside the strainer.

7. A steam valve comprising:
a valve casing, including a main steam inlet portion and a main steam outlet portion;
a first valve device disposed at a main steam inlet portion side in the valve casing including a valve seat, a valve body, a valve rod and a driving device;
a second valve device disposed at a main steam outlet portion side in the valve casing including a valve seat, a valve body, a valve rod and a driving device;
a strainer housed in the valve casing for surrounding the valve body of the first valve device; and
a closing plate rotatably provided in the strainer.

8. The steam valve according to claim 7, wherein the rotatably provided closing plate is disposed at a position facing the main steam inlet in an unsteady operation, and wherein the rotatably provided closing plate is disposed at the position opposite to the side of the main steam outlet in a steady operation.

9. A steam valve comprising:
a valve casing including a main steam inlet at one side and a main steam outlet disposed at another side in an opposite direction and in parallel with the main steam inlet;
a strainer provided in the valve casing; and
a closing portion provided in the strainer at a position and extending substantially in a first direction and a second direction, the first direction being orthogonal to an axial line of each of the main steam inlet and the main steam outlet, the second direction being parallel to the axial line of each of the main steam inlet and the main steam outlet.

10. The steam valve according to claim 9, wherein the closing portion is an interruption plate, and wherein the interruption plate is disposed outside the strainer.

11. A steam valve comprising:
a valve casing including a main steam inlet at one side and a main steam outlet disposed at another side in an opposite direction and in parallel with the main steam inlet;
a strainer provided in the valve casing;
a rotatably sliding rotating interruption plate surrounding the strainer; and
a driving device for driving the rotating interruption plate.

12. The steam valve according to claim 11, wherein the rotating interruption plate is provided with an adjusting stopper for adjusting a rotational transfer region.

13. The steam valve according to claim 11, wherein the rotating interruption plate is provided with a fitting piece for adjusting a rotational transfer region.

14. A steam valve comprising:
a valve casing including a main steam inlet disposed at one side and a main steam outlet disposed at another side in an opposite direction and in parallel with the main steam inlet;
a strainer provided in the valve casing;
an interruption plate for surrounding the strainer; and
an insertion and pull-out path formed in a valve lid of the valve casing, for freely inserting and pulling-out the interruption plate.

15. The steam valve according to claim 14, wherein the interruption plate is provided with an adjusting stopper for adjusting a rotational transfer region.

16. The steam valve according to claim 14, wherein the interruption plate is provided with a fitting piece for adjusting a rotational transfer region.

17. A steam valve comprising:
a valve casing including a main steam inlet disposed at one side and a main steam outlet disposed at another side in an opposite direction and in parallel with the main steam inlet;
a strainer provided in the valve casing; and
an interruption plate provided inside the strainer.

18. The steam valve according to claim 17, wherein the interruption plate is a projection piece disposed at an upstream side from a valve seat of the valve casing.

19. The steam valve according to claim 17, wherein the interruption plate is a projection piece disposed downstream side from a valve seat of the valve casing.

20. A steam valve comprising:
a valve casing including a main steam inlet portion and a main steam outlet portion;
a first valve device disposed at a main steam inlet portion side in the valve casing including a valve seat, a valve body, a valve rod and a driving device;
a second valve device disposed at a main steam outlet portion side in the valve casing including a valve seat, a valve body, a valve rod and a driving device;
a strainer housed in the valve casing for surrounding the valve body of the first valve device;
a closing portion provided in the strainer for blocking a part of a main steam flow flowing from outside to inside; and
a bulkhead provided between the strainer and the valve casing to prevent a collision of the two main steam flows having been separated by and flowing around from the closing portion.

21. The steam valve according to claim 20, wherein the closing portion provided in the strainer is disposed at a position facing the main steam inlet.

22. The steam valve according to claim 20, wherein the bulkhead is disposed at the position opposite to the side of the closing portion.

23. A steam valve comprising:
a valve casing including a main steam inlet portion and a main steam outlet portion;
a first valve device disposed at a main steam inlet portion side in the valve casing including a valve seat, a valve body, a valve rod and a driving device;
a second valve device disposed at a main steam outlet portion side in the valve casing including a valve seat, a valve body, a valve rod and a driving device;
a strainer housed in the valve casing for surrounding the valve body of the first valve device;
an interruption plate provided in the strainer for blocking a part of a main steam flow flowing from outside to inside; and
a bulkhead provided between the strainer and the valve casing to prevent a collision of the two main steam flows having been separated by and flowing around from the closing portion.

24. The steam valve according to claim 23, wherein the interruption plate is disposed outside the strainer and at a position facing the main steam inlet.

25. The steam valve according to claim 23, wherein the interruption plate is disposed inside the strainer and at a position facing the main steam inlet.

26. A steam valve comprising:
a valve casing including a main steam inlet portion and a main steam outlet portion;
a first valve device disposed at a main steam inlet portion side in the valve casing including a valve seat, a valve body, a valve rod and a driving device;
a second valve device disposed at a main steam outlet portion side in the valve casing including a valve seat, a valve body, a valve rod and a driving device;
a strainer housed in the valve casing for surrounding the valve body of the first valve device;
a closing portion provided in the strainer for blocking a part of a main steam flow flowing from outside to inside;
a bulkhead provided between the strainer and the valve casing to prevent a collision of the two main steam flows having been separated by and flowing around from the closing portion; and
a pressure-recovering chamber formed into a shape broadened toward the end, provided in the valve casing and disposed downstream from the strainer provided with the closing portion.

27. A steam valve comprising:
a valve casing including a main steam inlet at one side and a main steam outlet disposed at another side in an opposite direction and in parallel with the main steam inlet;
a strainer provided in the valve casing;
a closing portion for blocking a part of a main steam flow flowing from outside to inside; and
a bulkhead provided between the strainer and the valve casing to prevent a collision of the two main steam flows having been separated by and flowing around from the closing portion.

28. A steam valve comprising:
a valve casing including a main steam inlet at one side and a main steam outlet disposed at another side in an opposite direction and in parallel with the main steam inlet;

a strainer provided in the valve casing;

a guide plate provided at a side facing the main steam inlet of the strainer;

a closing portion for blocking a part of the main steam flow flowing from outside the guide plate to inside thereof; and a bulkhead provided between the strainer and the valve casing to prevent a collision of the two main steam flows having been separated by and flowing around from the closing portion.

29. The steam valve according to claim 28, wherein the guide plate is formed into a wing-shape.

30. A steam valve comprising:

a valve casing including a main steam inlet portion and a main steam outlet portion;

a first valve device disposed at a main steam inlet portion side in the valve casing including a valve seat, a valve body, a valve rod and a driving device;

a second valve device disposed at a main steam outlet portion side in the valve casing including a valve seat, a valve body, a valve rod and a driving device;

a strainer housed in the valve casing for surrounding the valve body of the first valve device;

a closing portion provided in the strainer for blocking a part or a main steam flow flowing from outside to inside;

a bulkhead provided between the strainer and the valve casing to prevent a collision of the two main steam flows having been separated by and flowing around from the closing portion; and a rack-like flow path formed between the valve casing and the strainer along a shaft length direction of the valve rod of the first valve device at a distance.

31. The steam valve according to claim 30, wherein the rack-like flow path is partitioned with a flow path partitioning plate and the flow path partitioning plate is disposed around an entire outside circumference of the strainer.

32. The steam valve according to claim 31, wherein the flow path partitioning plate is disposed around an entire circumference of the strainer.

33. The steam valve according to claim 31, wherein the flow path partitioning plate is disposed around a predetermined part of a circumferential length of the entire circumference of the strainer.

* * * * *